(12) United States Patent
Takahashi et al.

(10) Patent No.: US 10,044,182 B2
(45) Date of Patent: Aug. 7, 2018

(54) SECONDARY BATTERY, SECONDARY BATTERY MODULE, POWER STORAGE SYSTEM, AND METHOD FOR OPERATING THEREOF

(71) Applicant: SEMICONDUCTOR ENERGY LABORATORY CO., LTD., Atsugi-shi, Kanagawa-ken (JP)

(72) Inventors: Kei Takahashi, Kanagawa (JP); Jun Koyama, Kanagawa (JP); Masaaki Hiroki, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 448 days.

(21) Appl. No.: 14/156,761

(22) Filed: Jan. 16, 2014

(65) Prior Publication Data

US 2014/0203654 A1 Jul. 24, 2014

(30) Foreign Application Priority Data

Jan. 21, 2013 (JP) .................. 2013-008060

(51) Int. Cl.
 *H02J 7/00* (2006.01)
 *H02J 1/00* (2006.01)
 *H01M 10/42* (2006.01)

(52) U.S. Cl.
 CPC ........... *H02J 1/00* (2013.01); *H01M 10/4207* (2013.01); *H01M 10/4257* (2013.01);
 (Continued)

(58) Field of Classification Search
 CPC ...................................... H02J 7/007
 (Continued)

(56) References Cited

U.S. PATENT DOCUMENTS 5,488,283 A * 1/1996 Dougherty .......... B60L 11/1855
 307/10.1
5,764,032 A * 6/1998 Moore .................. H02J 7/0024
 307/66

(Continued)

FOREIGN PATENT DOCUMENTS

CN 001578045 A 2/2005
CN 101641247 A 2/2010
(Continued)

OTHER PUBLICATIONS

International Search Report (Application No. PCT/JP2014/050866) dated Apr. 8, 2014.

(Continued)

*Primary Examiner* — Adi Amrany
(74) *Attorney, Agent, or Firm* — Nixon Peabody LLP; Jeffrey L. Costellia

(57) ABSTRACT

Degradation of a secondary battery or the like is prevented. A reduction in the capacity of a secondary battery or the like due to charging or discharging is prevented. A secondary battery module in which a secondary battery can be charged in a charging period into which short discharging periods are inserted is provided. A secondary battery module in which a plurality of secondary batteries are connected in parallel, and in a charging period of the secondary batteries, current due to short-time discharging of one secondary battery can be used for charging another secondary battery is provided. To carry out such operation, a secondary battery module includes a plurality of secondary batteries, a DC/DC converter, a switch, and a control circuit.

21 Claims, 11 Drawing Sheets

(52) U.S. Cl.
CPC ............ *H02J 7/007* (2013.01); *H02J 7/0022* (2013.01); *Y02T 10/7055* (2013.01); *Y10T 307/50* (2015.04); *Y10T 307/707* (2015.04)

(58) Field of Classification Search
USPC .......................................................... 307/51
See application file for complete search history.

(56) References Cited

U.S. PATENT DOCUMENTS

| | | | |
|---|---|---|---|
| 6,181,100 B1 * | 1/2001 | Shoji .................... | H02J 7/0047 320/103 |
| 6,320,358 B2 * | 11/2001 | Miller ......................... | 307/10.1 |
| 6,507,506 B1 * | 1/2003 | Pinas .................. | B60L 11/1851 307/10.1 |
| 6,639,384 B2 * | 10/2003 | Hasegawa ............ | H02J 7/1423 320/126 |
| 6,879,057 B1 * | 4/2005 | Pinas .................. | B60R 16/0238 307/10.1 |
| 6,879,134 B2 | 4/2005 | Stanesti et al. | |
| 6,977,482 B2 | 12/2005 | Stanesti et al. | |
| 7,009,364 B2 | 3/2006 | Stanesti et al. | |
| 7,336,002 B2 * | 2/2008 | Kato .................. | F02N 11/0866 307/10.6 |
| 7,489,110 B2 | 2/2009 | Stanesti et al. | |
| 7,501,720 B2 | 3/2009 | Stanesti et al. | |
| 7,791,313 B2 | 9/2010 | Stanesti et al. | |
| 7,804,273 B2 | 9/2010 | Stanesti et al. | |
| 8,203,309 B2 | 6/2012 | Maegawa | |
| 8,597,830 B2 | 12/2013 | Kawakami et al. | |
| 8,909,397 B2 | 12/2014 | Aridome et al. | |
| 9,110,107 B2 * | 8/2015 | Busca .................... | H02H 3/087 |
| 9,240,704 B2 * | 1/2016 | Wortberg .................. | H02J 1/08 |
| 9,461,347 B2 | 10/2016 | Kise et al. | |
| 2002/0140397 A1 | 10/2002 | Hasegawa et al. | |
| 2004/0155627 A1 | 8/2004 | Stanesti et al. | |
| 2004/0192407 A1 * | 9/2004 | Formenti ............. | H02J 7/0013 455/572 |
| 2006/0108954 A1 * | 5/2006 | Sebille .................... | F02N 11/04 318/108 |
| 2008/0134821 A1 * | 6/2008 | Schepperle ............. | F16H 63/02 74/335 |
| 2009/0127930 A1 * | 5/2009 | Senda .................... | B60R 16/03 307/9.1 |
| 2009/0206802 A1 * | 8/2009 | Mori ........................ | H02H 5/04 322/99 |
| 2009/0288417 A1 * | 11/2009 | Armiroli ............... | F02N 11/006 60/656 |
| 2009/0295319 A1 * | 12/2009 | Rouis ..................... | F02N 11/04 318/400.13 |
| 2010/0087976 A1 * | 4/2010 | Aridome ............... | B60K 6/405 701/22 |
| 2011/0025000 A1 * | 2/2011 | Inoue .................. | B60G 17/0157 280/5.507 |
| 2011/0227341 A1 * | 9/2011 | Rouis ...................... | F02N 11/04 290/31 |
| 2011/0294009 A1 | 12/2011 | Kawakami et al. | |
| 2012/0034526 A1 | 2/2012 | Kurahashi | |
| 2012/0074894 A1 | 3/2012 | Chen et al. | |
| 2013/0033793 A1 * | 2/2013 | Takeda ................. | G01R 31/362 361/91.4 |
| 2013/0181645 A1 * | 7/2013 | Kopken .................... | H02P 3/22 318/400.22 |
| 2013/0293248 A1 * | 11/2013 | Ho ........................ | B60L 3/0007 324/750.01 |
| 2014/0197802 A1 * | 7/2014 | Yamazaki ............. | H02J 7/0052 320/137 |

FOREIGN PATENT DOCUMENTS

| | | |
|---|---|---|
| EP | 2130734 A | 12/2009 |
| JP | 06-098473 A | 4/1994 |
| JP | 08-079967 A | 3/1996 |
| JP | 11-289676 A | 10/1999 |
| JP | 2001-023690 A | 1/2001 |
| JP | 3186811 | 7/2001 |
| JP | 2003-092805 A | 3/2003 |
| JP | 2004-224267 A | 8/2004 |
| JP | 2005-197174 A | 7/2005 |
| JP | 2006-514529 A | 4/2006 |
| JP | 2006-286218 A | 10/2006 |
| JP | 2008-035700 A | 2/2008 |
| JP | 2009-035243 A | 2/2009 |
| JP | 2009-106007 A | 5/2009 |
| JP | 2009-181907 | 8/2009 |
| JP | 2009-181907 A | 8/2009 |
| JP | 2009-199934 A | 9/2009 |
| JP | 2010-098874 A | 4/2010 |
| JP | 2011-151943 A | 8/2011 |
| JP | 2012-070609 A | 4/2012 |
| JP | 2012-165646 A | 8/2012 |
| JP | 5057156 | 10/2012 |
| JP | 2013-110885 A | 6/2013 |
| TW | 383492 | 3/2000 |
| WO | WO-1998/039832 | 9/1998 |
| WO | WO-2004/073089 | 8/2004 |
| WO | WO-2005/011018 | 2/2005 |
| WO | WO-2010/113268 | 10/2010 |
| WO | WO-2011/093126 | 8/2011 |

OTHER PUBLICATIONS

Written Opinion (Application No. PCT/JP2014/050866) dated Apr. 8, 2014.
Taiwanese Office Action (Application No. 103101804) dated Jul. 11, 2017.

* cited by examiner

FIG. 2A1
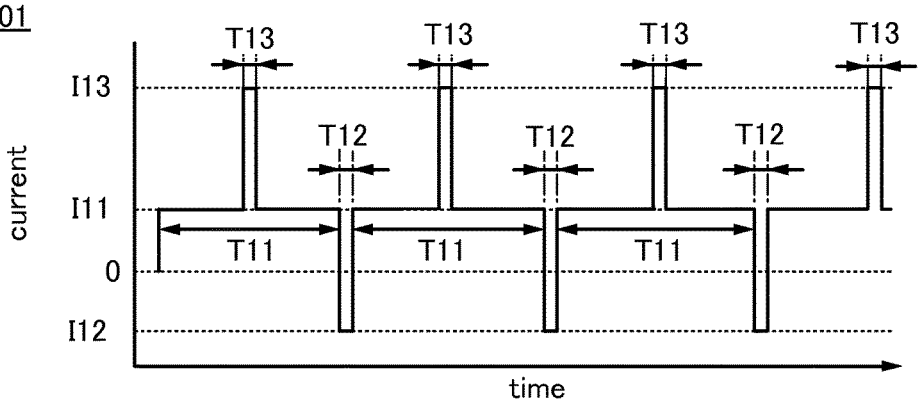
FIG. 2A2
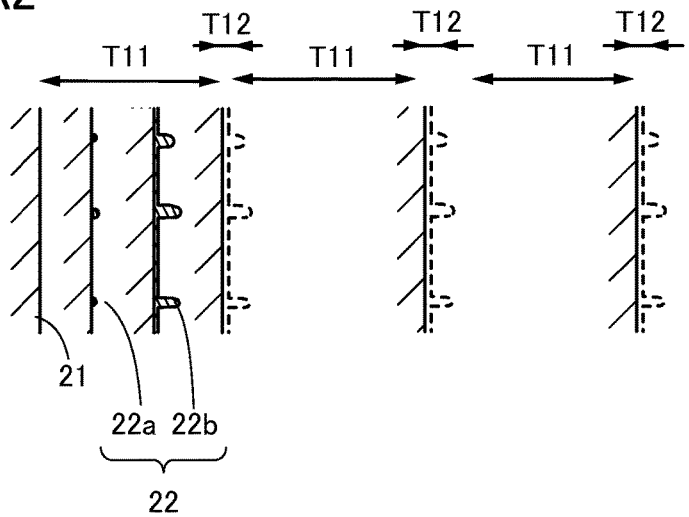
FIG. 2B
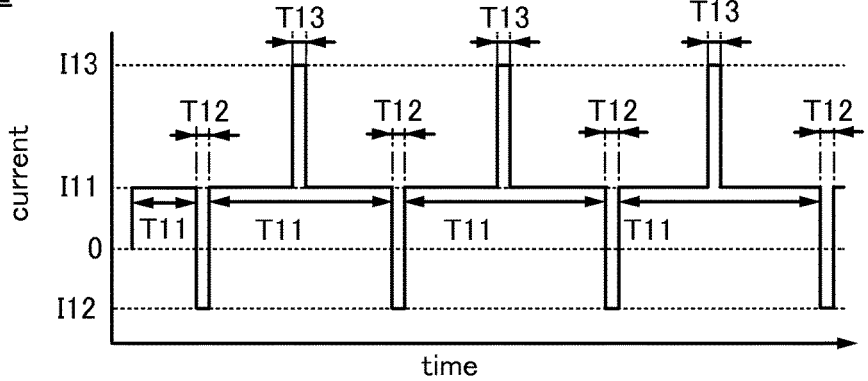

FIG. 11A1
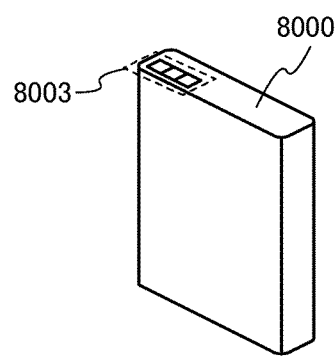
FIG. 11A2
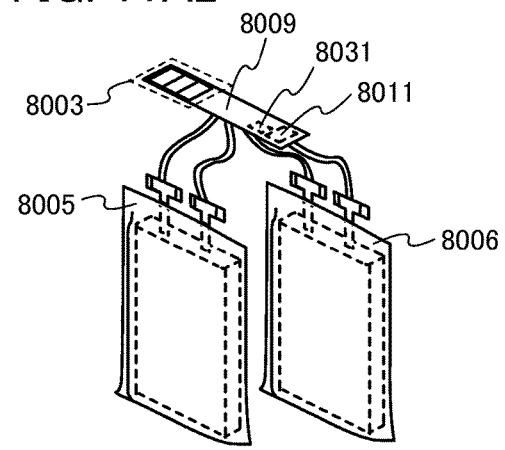
FIG. 11B
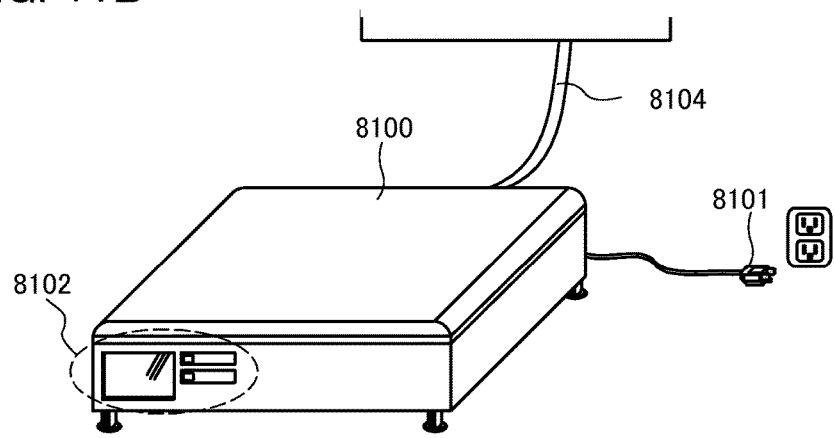
FIG. 11C
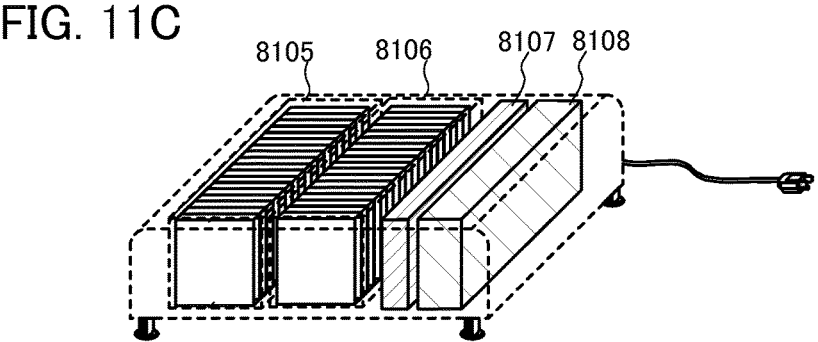

SECONDARY BATTERY, SECONDARY BATTERY MODULE, POWER STORAGE SYSTEM, AND METHOD FOR OPERATING THEREOF

TECHNICAL FIELD

The present invention relates to a secondary battery, a secondary battery module, a method for charging the secondary battery and the secondary battery module, a method for discharging the secondary battery and the secondary battery module, a method for operating the secondary battery and the secondary battery module, a power storage system, and a method for operating the power storage system.

BACKGROUND ART

In recent years, various power storage devices such as secondary batteries including lithium-ion secondary batteries and the like, lithium-ion capacitors, and air cells have been actively developed. In particular, demand for lithium-ion secondary batteries with high output and high energy density has rapidly grown with the development of the semiconductor industry, for electrical appliances, for example, portable information terminals such as mobile phones, smartphones, and notebook computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

REFERENCE

Patent Document

[Patent Document 1] PCT International Publication No. 10/113,268

DISCLOSURE OF INVENTION

The conventional secondary battery has problems of a capacity reduction and a resistance increase due to gradual degradation by repetitive charge and discharge.

For example, in the case of a lithium-ion secondary battery, the resistance of a negative electrode may increase in a charge period. One of the reasons is that carrier ions transferred from a positive electrode to a negative electrode cause a deposit on the negative electrode when the potential of the negative electrode becomes below the allowable value.

When a lithium-ion secondary battery is charged, for example, lithium ions that are carrier ions are extracted from a positive electrode active material over a positive electrode current collector included in a positive electrode, and move to a negative electrode active material over a negative electrode current collector included in a negative electrode. Then, the lithium ions are inserted into the negative electrode active material. However, when the potential of the negative electrode becomes below the allowable value, lithium is deposited on a surface of the negative electrode active material, which indicates abnormal charging.

Lithium is deposited unevenly on a surface of a negative electrode active material. As a result, deposited lithium is likely to become a dendrite (one kind of deposits). The formed deposit might cause the positive electrode and the negative electrode to be short-circuited, in which case there is a risk in which the battery catches fire, for example. Further, when the deposited lithium is separated, the amount of lithium is reduced by the amount of the separated lithium, resulting in a decrease in the capacity of the battery.

In view of the above, an object of one embodiment of the present invention is to prevent degradation of a secondary battery or the like. Another object of one embodiment of the present invention is to prevent a reduction in the capacity of a secondary battery or the like due to charging or discharging. Another object of one embodiment of the present invention is to control a secondary battery or the like with low power consumption. Another object of one embodiment of the present invention is to improve the reliability of a secondary battery or the like. Another object of one embodiment of the present invention is to increase the safety of a secondary battery or the like.

To achieve any of the above objects, one embodiment of the present invention provides a secondary battery module in which a secondary battery can be charged in a charging period into which short discharging periods are inserted.

One embodiment of the present invention provides a secondary battery module in which a plurality of secondary batteries are connected in parallel, and in a charging period of the secondary batteries, current due to short-time discharging of one secondary battery can be used for charging another secondary battery. To carry out such operation, a secondary battery module includes a plurality of secondary batteries, a DC/DC converter, a switch, and a control circuit.

Specifically, one embodiment of the present invention is a secondary battery module including a first secondary battery, a second secondary battery, a DC/DC converter, a first switch, a second switch, and a control circuit. The first secondary battery and the second secondary battery are electrically connected to each other in parallel. One pole of the first secondary battery is electrically connected to one terminal of the DC/DC converter. One pole of the second secondary battery is electrically connected to the other terminal of the DC/DC converter. One terminal of the first switch is electrically connected to the one terminal of the DC/DC converter. One terminal of the second switch is electrically connected to the other terminal of the DC/DC converter. The control circuit controls the DC/DC converter, the first switch, and the second switch.

Another embodiment of the present invention is a secondary battery module including a first secondary battery, a second secondary battery, a first DC/DC converter, a second DC/DC converter, a first switch, a second switch, and a control circuit. The first secondary battery and the second secondary battery are electrically connected to each other in parallel. One pole of the first secondary battery is electrically connected to one terminal of the first DC/DC converter and one terminal of the second DC/DC converter. One pole of the second secondary battery is electrically connected to the other terminal of the first DC/DC converter and the other terminal of the second DC/DC converter. One terminal of the first switch is electrically connected to the one terminal of the first DC/DC converter and the one terminal of the second DC/DC converter. One terminal of the second switch is electrically connected to the other terminal of the first DC/DC converter and the other terminal of the second DC/DC converter. The control circuit controls the first DC/DC converter, the second DC/DC converter, the first switch, and the second switch.

Another embodiment of the present invention is a secondary battery module including a first secondary battery, a second secondary battery, a DC/DC converter, a first switch, a second switch, a third switch, a fourth switch, a control circuit, an input terminal, and an output terminal. The first secondary battery and the second secondary battery are electrically connected to each other in parallel. One pole of the first secondary battery is electrically connected to one terminal of the DC/DC converter. One pole of the second secondary battery is electrically connected to the other terminal of the DC/DC converter. One terminal of the first switch is electrically connected to the one terminal of the DC/DC converter. The other terminal of the first switch is electrically connected to the input terminal. One terminal of the second switch is electrically connected to the other terminal of the DC/DC converter. The other terminal of the second switch is electrically connected to the input terminal One terminal of the third switch is electrically connected to the one terminal of the DC/DC converter. The other terminal of the third switch is electrically connected to the output terminal One terminal of the fourth switch is electrically connected to the other terminal of the DC/DC converter. The other terminal of the fourth switch is electrically connected to the output terminal. The control circuit controls the DC/DC converter, the first switch, the second switch, the third switch, and the fourth switch.

One embodiment of the present invention can prevent degradation of a secondary battery or the like. One embodiment of the present invention can prevent a reduction in the capacity of a secondary battery or the like due to charging or discharging. One embodiment of the present invention enables a secondary battery or the like to be controlled with low power consumption. One embodiment of the present invention can improve the reliability of a secondary battery or the like. One embodiment of the present invention can increase the safety of a secondary battery or the like.

BRIEF DESCRIPTION OF DRAWINGS

FIGS. 2A1, 2A2, and 2B illustrate methods for charging a secondary battery.
FIGS. 11A1 and 11A2 illustrate a secondary battery module and FIGS. 11B and 11C illustrate a power storage device.

BEST MODE FOR CARRYING OUT THE INVENTION

Figure 1:
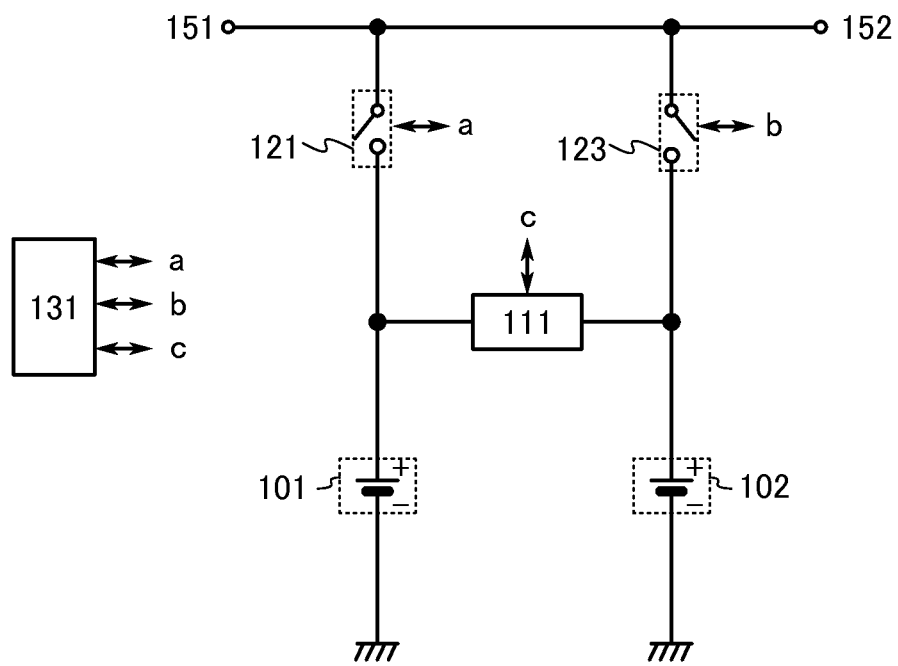
FIG. 1 illustrates a secondary battery module.

Embodiments of the present invention will be described in detail below with reference to the drawings. However, the present invention is not limited to the description of the embodiments, and it is easily understood by those skilled in the art that the modes and details can be modified in various ways. Therefore, the invention should not be construed as being limited to the description in the following embodiments.

Note that in drawings used in this specification, the thicknesses of films, layers, and substrates and the sizes of components (e.g., the sizes of regions) are exaggerated for simplicity in some cases. Therefore, the sizes of the components are not limited to those in the drawings and relative sizes between the components in the drawings.

Note that the ordinal numbers such as "first" and "second" in this specification and the like are used for convenience and do not denote the order of steps, the stacking order of layers, or the like. In addition, the ordinal numbers in this specification and the like do not denote particular names which specify the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Note that a voltage refers to a potential difference between a certain potential and a reference potential (e.g., a ground potential (GND) or a source potential) in many cases. Accordingly, a voltage can also be called a potential.

Functions of a "source" and a "drain" are sometimes replaced with each other when a transistor of opposite polarity is used or when the direction of current flowing is changed in circuit operation, for example. Therefore, the terms "source" and "drain" can be replaced with each other in this specification and the like.

In this specification and the like, a connection includes an electrical connection, a functional connection, and a direct connection. A connection relation of components described in embodiments is not limited to the connection relation illustrated in the drawings and described in the specification.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where there are several possible portions to which a terminal can be connected, it is not necessary to specify all the portions to which the terminal is connected. Thus, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least connection portions of a circuit are specified. Alternatively, it might be possible for those skilled in the art to specify the invention when at least a function of a circuit is specified. In other words, when a function of a circuit is specified, one embodiment of the present invention can be clear. Further, it can be determined that one embodiment of the invention whose function is specified is disclosed in this specification and the like. Thus, when not a function but connection portions of a circuit are specified, the circuit is disclosed as one embodiment of the invention, and one embodiment of the invention can be constituted. Alternatively, when not connection portions but a function of a circuit is specified, the circuit is disclosed as one embodiment of the invention, and one embodiment of the invention can be constituted.

Note that in this specification and the like, a positive electrode and a negative electrode for a secondary battery may be collectively referred to as electrodes or poles; the electrode or the pole in this case refers to at least one of the positive electrode and the negative electrode.

Structures or methods described in Detailed Description of the Invention can be combined as appropriate.

(Embodiment 1)

In this embodiment, examples of a structure of a secondary battery module of one embodiment of the present invention, a method for charging a secondary battery included in the secondary battery module, and methods for charging and discharging the secondary battery module will be described.

<Structure>

As illustrated in FIG. 1, a secondary battery module 100 includes a secondary battery 101, a secondary battery 102, a DC/DC converter 111, a switch 121, a switch 123, and a control circuit 131.

As the secondary battery 101 and the secondary battery 102, secondary batteries such as a lithium-ion secondary battery, a lead storage battery, a lithium-ion polymer secondary battery, lithium batteries, a nickel-metal hydride battery, a nickel-cadmium battery, a nickel-iron battery, a nickel-zinc battery, and a zinc-silver oxide battery; secondary flow batteries such as a redox flow battery, a zinc-chlorine battery, and a zinc-bromide battery; mechanically rechargeable secondary batteries such as an aluminum-air battery, a zinc-air battery, and an iron-air battery; and high-operating-temperature secondary batteries such as a sodium-sulfur battery and a lithium-iron sulfide battery; and the like can be used, for example.

The secondary battery 101 and the secondary battery 102 are electrically connected to each other in parallel.

One pole (a positive electrode in FIG. 1) of the secondary battery 101 is electrically connected to one terminal of the DC/DC converter 111. The other pole (a negative electrode in FIG. 1) of the secondary battery 101 is grounded. One pole (a positive electrode in FIG. 1) of the secondary battery 102 is electrically connected to the other terminal of the DC/DC converter 111. The other pole (a negative electrode in FIG. 1) of the secondary battery 102 is grounded.

One terminal of the switch 121 is electrically connected to the one terminal of the DC/DC converter 111. The other terminal of the switch 121 is electrically connected to an input terminal 151. One terminal of the switch 123 is electrically connected to the other terminal of the DC/DC converter 111. The other terminal of the switch 123 is electrically connected to an output terminal 152.

The control circuit 131 controls the operations of the DC/DC converter 111, the switch 121, and the switch 123.

<Charging of Secondary Battery>

FIG. 2A1 shows an example of a method for charging the secondary battery 101. FIG. 2A2 is a schematic diagram showing a surface of a negative electrode 21 in a charging period of the secondary battery 101. FIG. 2B shows an example of a method for charging the secondary battery 102. In the graphs in FIGS. 2A1 and 2B, the horizontal axis represents time and the vertical axis represents charge/discharge current. As shown in FIGS. 2A1 and 2B, short discharging periods are inserted into one charging period of each of the secondary battery 101 and the secondary battery 102 included in the secondary battery module 100.

The secondary battery 101 is charged when the value of charge/discharge current is set to a positive value I11 in a period T11 in FIG. 2A1, and the secondary battery 101 is discharged when the value of charge/discharge current is set to a negative value I12 in a period T12 in FIG. 2A1, for example. Here, the period T12 corresponds to the above "short discharging period". A period T13 and a value I13 will be described later.

The period T12 is shorter than the period T11. For example, the length of the period T12 is preferably 1/100 to 1/3 times that of the period T11. Further, the period T12 is preferably longer than or equal to 0.1 seconds and shorter than or equal to 250 seconds, further preferably longer than or equal to 3 seconds and shorter than or equal to 30 seconds, still further preferably longer than or equal to 5 seconds and shorter than or equal to 15 seconds.

In the secondary battery, the resistance of the negative electrode 21 is increased in some cases in a charging period. One of the reasons is that carrier ions transferred from the positive electrode to the negative electrode 21 cause a deposit on the negative electrode 21 when the potential of the negative electrode 21 becomes below the allowable value, for example. The deposit is formed unevenly on a surface of the negative electrode because of the shape or conditions of the surface, so that a dendrite deposit 22 (a dendrite crystal or a dendrite, also referred to as a whisker-like deposit) is likely to be generated. This results in a short-circuit between the positive electrode and the negative electrode, an increase in the resistance of the negative electrode, a reduction in the capacity of the secondary battery, or the like.

In the case of a lithium-ion secondary battery, for example, lithium is inserted into the negative electrode 21, and at the same time, lithium is deposited on the surface of the electrode to be a deposit 22a, in some cases. When lithium begins to be deposited, the potential of the negative electrode is reduced and lithium becomes more likely to be deposited, which results in growth to a deposit 22b. Deposit of lithium, which is likely to grow to be the dendrite deposit 22b, causes a short-circuit or a reduction in the capacity due to separation. Further, deposited lithium fills a cavity in an electrode or a separator, so that the reactivity is lowered and the resistance is increased.

However, when short discharging periods are inserted into one charging period as illustrated in FIGS. 2A1, 2A2, and 2B, an increase in the resistance of the negative electrode can be prevented. With the short discharging periods inserted into one charging period, for example, even when the deposit grows on the negative electrode, the deposit 22 is dissolved and the growth of the deposit 22 is suppressed; accordingly, an increase in the resistance of the negative electrode 21 can be prevented.

In the case of a lithium-ion secondary battery, for example, deposited lithium can be dissolved by discharging. In the discharging, extraction of lithium ions from a negative electrode active material (e.g., graphite) and dissolution of deposited lithium occur at the same time. The deposit 22b (dendritically grown lithium), which is a particularly problematic lithium deposit, is likely to cause electric-field concentration because of its shape, which promotes reaction; thus, discharging with high current density is more effective to dissolve the lithium deposit. Discharging with current density higher than that for charging is performed to suppress the growth of a dendrite due to deposition of lithium in charging, whereby the dendritically grown lithium can be selectively dissolved.

Although the lengths of the period T11 and the period T12 in FIGS. 2A1 and 2B are substantially constant, one embodiment of the present invention is not limited thereto. For example, the length of the period T11 can be gradually increased or decreased. Alternatively, the length of the period T11 can vary every cycle. Similarly, the length of the period T12 can be gradually increased or decreased. Alternatively, the length of the period T12 can vary every cycle.

<Charging and Discharging of Secondary Battery Module>

Next, examples of methods for charging and discharging the secondary battery module 100 will described with reference to FIGS. 3A and 3B, FIGS. 4A and 4B, and FIGS. 5A and 5B. In the examples, alternating-current voltage is converted into direct-current voltage and the secondary battery is charged with the direct-current voltage. After that, the voltage of the secondary battery is converted into alternating-current voltage and the alternating-current voltage is output. Thus, the secondary battery module 100 includes an AC/DC converter 141 between the input terminal 151 and the switch 121 and a DC/AC converter 142 between the output terminal 152 and the switch 123. The AC/DC converter 141 and the DC/AC converter 142 are controlled by the control circuit 131.

<<Charging of Both Secondary Batteries>>

Figure 3A:
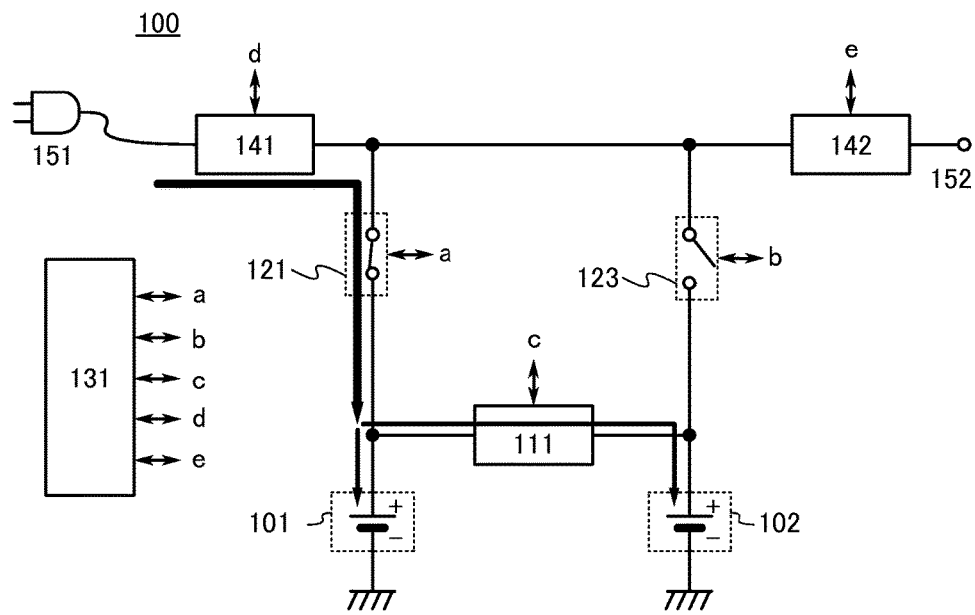
FIGS. 3A and 3B each illustrate a charging method.
Figure 3B:
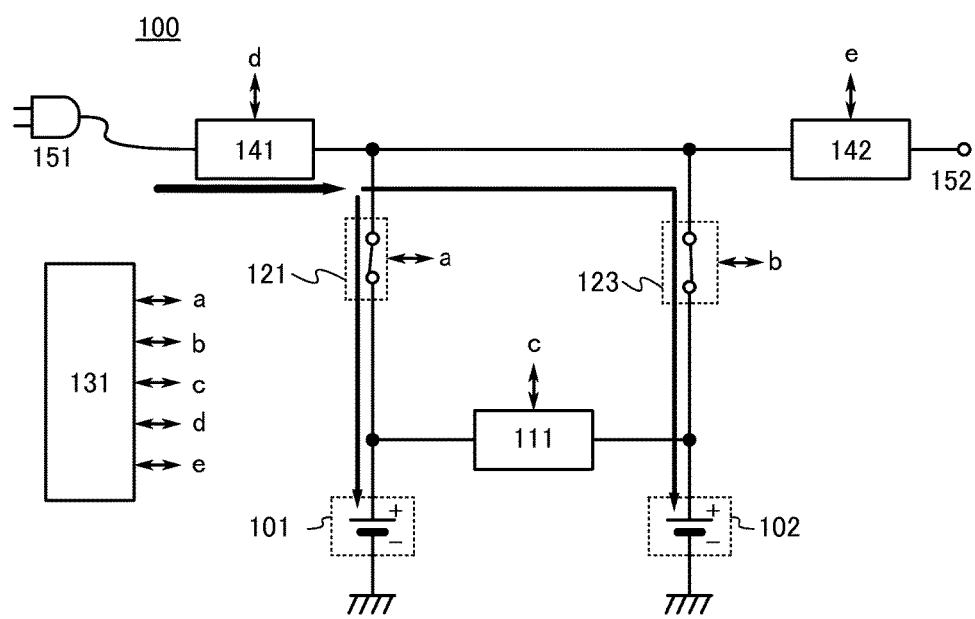

In a charging period of the secondary battery module 100, both of the secondary batteries 101 and 102 can be charged as in FIG. 3A or FIG. 3B. This occurs when both of the secondary batteries 101 and 102 are in the period T11 in FIGS. 2A1 and 2B.

As in FIG. 3A, for example, the input terminal 151 is electrically connected to an alternating-current power source (not illustrated), the switch 121 is turned on, and the switch 123 is turned off, so that current flows in the direction from the switch 121 to the secondary battery 102 through the DC/DC converter 111.

Alternating current supplied from the power source is converted into direct current by the AC/DC converter 141, and part (e.g., about ½) of the current flows through the DC/DC converter 111 to be used for charging the secondary battery 102. The rest (e.g., about ½) of the current is used for charging the secondary battery 101. The distribution ratio of the current to the secondary batteries 101 and 102 can be controlled by the DC/DC converter 111 as appropriate.

Note that the secondary batteries 101 and 102 can be charged also when the switch 121 is turned off and the switch 123 is turned on so that current flows in the direction from the switch 123 to the secondary battery 101 through the DC/DC converter 111.

Alternatively, the switches 121 and 123 are turned on and the DC/DC converter 111 is turned off as in FIG. 3B.

Current from the AC/DC converter 141 flows through the switches 121 and 123 to be used for charging the secondary batteries 101 and 102. In that case, the distribution ratio of the current used for charging depends on the ratio of the resistance of the secondary battery 101 to the resistance of the secondary battery 102 and the potential difference between the secondary battery 101 and the secondary battery 102.

<<Short Discharging of One Secondary Battery in Charging Period>>

Figure 4A:
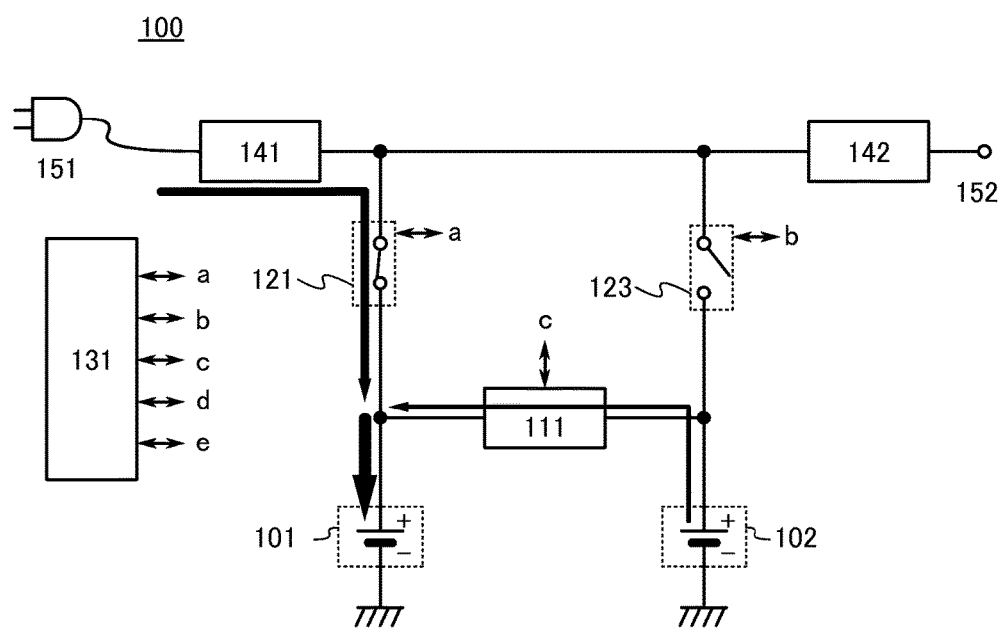
FIGS. 4A and 4B each illustrate a method for discharging for a short time in a charging period.
Figure 4B:
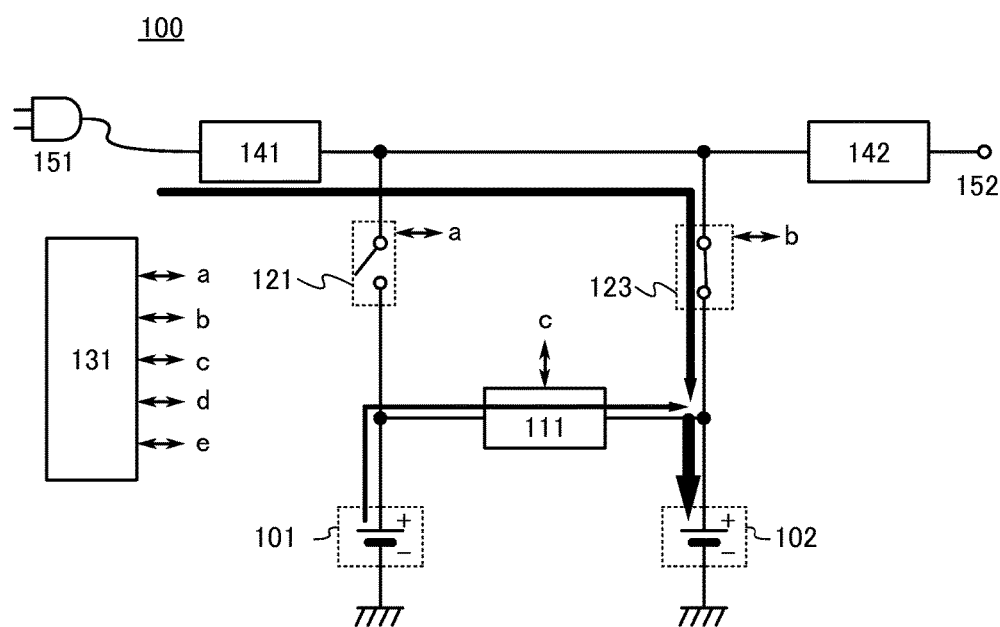

When one of the secondary batteries 101 and 102 is discharged for a short time in the charging period of the secondary battery module 100, the secondary battery module 100 can be charged as in FIG. 4A or FIG. 4B. This occurs in the period T12 or the period T13 in FIGS. 2A1 and 2B. Note that when one secondary battery is in the period T12, the other secondary battery is in the period T13.

To discharge the secondary battery 102 for a short time, for example, the switch 121 is turned on, and the switch 123 is turned off, so that current flows in the direction from the secondary battery 102 to the secondary battery 101 through the DC/DC converter 111 as in FIG. 4A.

At this time, direct current converted by the AC/DC converter 141 flows through the switch 121 to be used for charging the secondary battery 101. Current due to short-time discharging of the secondary battery 102 flows through the DC/DC converter 111 to be used for charging the secondary battery 101. As a result, the secondary battery 101 is charged with a current (I13), which is the sum of the current from the AC/DC converter 141 and the discharge current from the secondary battery 102. This occurs in the period T13 in FIG. 2A1.

In a similar manner, to discharge the secondary battery 101 for a short time, the switch 121 is turned off, and the switch 123 is turned on, so that current flows in the direction from the secondary battery 101 to the secondary battery 102 through the DC/DC converter 111 as in FIG. 4B.

At this time, current from the AC/DC converter 141 flows through the switch 123 to be used for charging the secondary battery 102. Current due to short-time discharging of the secondary battery 101 flows through the DC/DC converter 111 to be used for charging the secondary battery 102. As a result, the secondary battery 102 is charged with a current (I13), which is the sum of the current from the AC/DC converter 141 and the discharge current from the secondary battery 101. This occurs in the period T13 in FIG. 2B.

In the above manner, each secondary battery included in the secondary battery module 100 can be discharged for a short time in the charging period while constant current is supplied from the power source to the secondary battery module 100.

Note that the discharge current in the charging period needs to be high enough for suppressing an increase in the resistance of the negative electrode (e.g., for dissolving a deposit on the surface of the negative electrode). Thus, the short-time discharging of the secondary battery in the charging period is preferably intentional discharging, rather than natural discharging (also referred to as self-discharging) due to stop of charging.

<<Discharging of Both Secondary Batteries>>

Figure 5A:
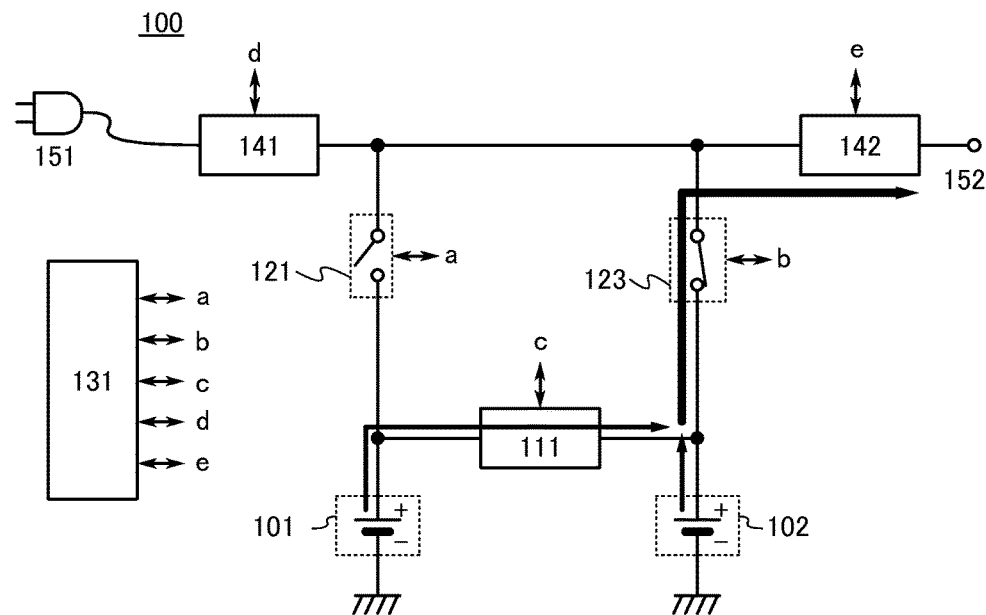
FIGS. 5A and 5B each illustrate a discharging method.
Figure 5B:
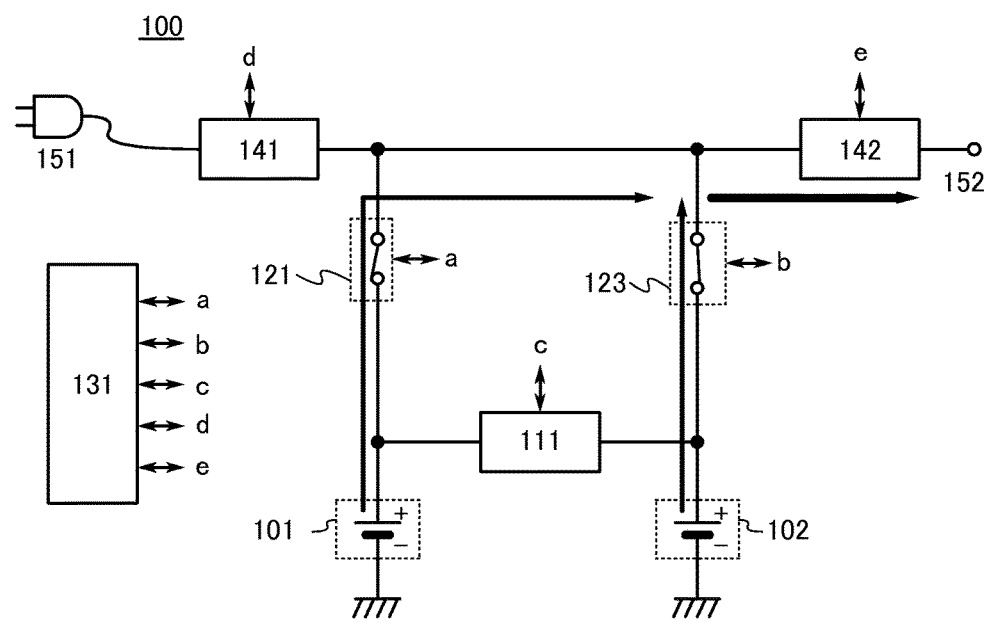

The secondary battery module 100 can be discharged as in FIG. 5A or FIG. 5B.

As in FIG. 5A, for example, the output terminal 152 is electrically connected to an external load (not illustrated), the switch 121 is turned off, and the switch 123 is turned on, so that current flows in the direction from the secondary battery 101 to the switch 123 through the DC/DC converter 111.

Direct current output from the secondary batteries 101 and 102 through the switch 123 is converted into alternating current by the DC/AC converter 142 and the alternating current is supplied to the external load.

Note that the secondary batteries 101 and 102 can be discharged also when the switch 121 is turned on and the switch 123 is turned off so that current flows in the direction from the secondary battery 102 to the switch 121 through the DC/DC converter 111.

Alternatively, the switches 121 and 123 are turned on and the DC/DC converter 111 is turned off as in FIG. 5B.

Direct-current voltage output from the secondary batteries 101 and 102 through the switches 121 and 123 is converted into alternating-current voltage by the DC/AC converter 142 and the alternating current is supplied to the external load.

When the short discharging periods are inserted into the charging period of the secondary battery in the above manner, even when a deposit is formed on the negative electrode of the secondary battery, for example, the deposit is dissolved and the growth of the deposit is suppressed; accordingly, an increase in the resistance of the negative electrode can be prevented. Thus, degradation of a secondary battery or the like can be prevented. Further, a reduction in the capacity of a secondary battery or the like due to charging or discharging can be prevented. Furthermore, a secondary battery or the like can be controlled with low power consumption. In addition, the reliability of a secondary battery or the like can be improved. Moreover, the safety of a secondary battery or the like can be increased.

In the secondary battery module 100 including a plurality of secondary batteries electrically connected to each other in parallel, in the charging period of the secondary batteries, discharge current of one secondary battery can be used for charging another secondary battery. Thus, short discharge periods can be inserted into the charging period of each secondary battery included in the secondary battery module 100 while constant current and voltage from the power source is supplied to the secondary battery module 100.

(Embodiment 2)

In this embodiment, other examples of the secondary battery module of one embodiment of the present invention will be described with reference to FIGS. 6A and 6B, FIG. 7, and FIG. 8.

In Embodiment 1 and FIG. 1, FIGS. 2A1, 2A2, and 2B, FIGS. 3A and 3B, FIGS. 4A and 4B, and FIGS. 5A and 5B, the secondary battery module 100 including two switches, one DC/DC converter, one input terminal, and one output terminal is described; however, one embodiment of the present invention is not limited thereto.

For example, a plurality of DC/DC converters may be included. The secondary battery module 100 may include a DC/DC converter 112 and a DC/DC converter 113 as in FIG. 6A, for example. In that case, the DC/DC converter 112 and the DC/DC converter 113 are unidirectional DC/DC converters, one of which is set so that current flows in the direction from the secondary battery 101 to the secondary battery 102 and the other of which is set so that current flows in the direction from the secondary battery 102 to the secondary battery 101. This structure allows the use of a unidirectional DC/DC converter having high conversion efficiency, enabling the secondary battery module 100 to be efficient.

An input-output terminal 153 serving as both an input terminal and an output terminal may be included.

Figure 6A:
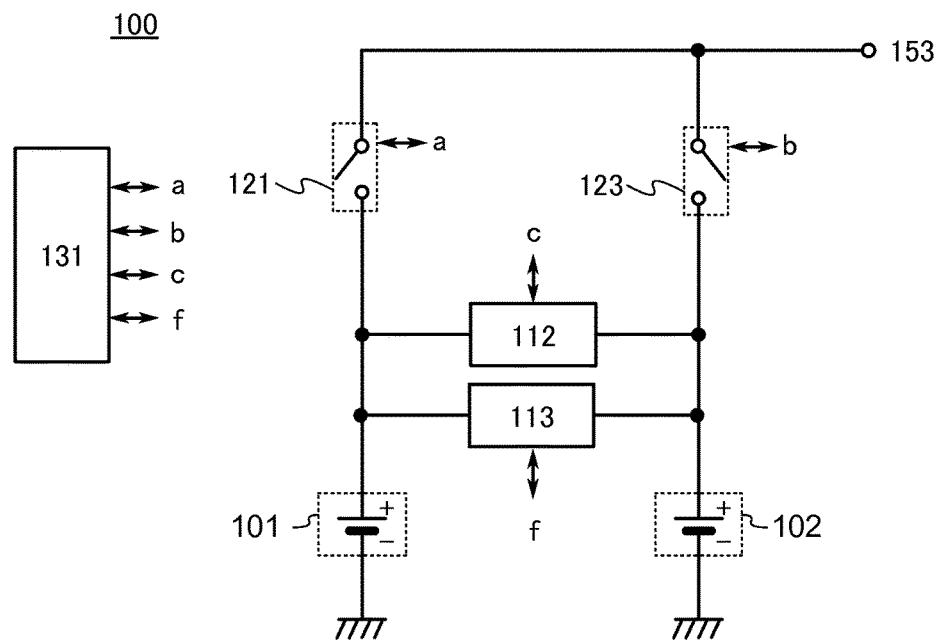
FIGS. 6A and 6B each illustrate a secondary battery module.
Figure 6B:
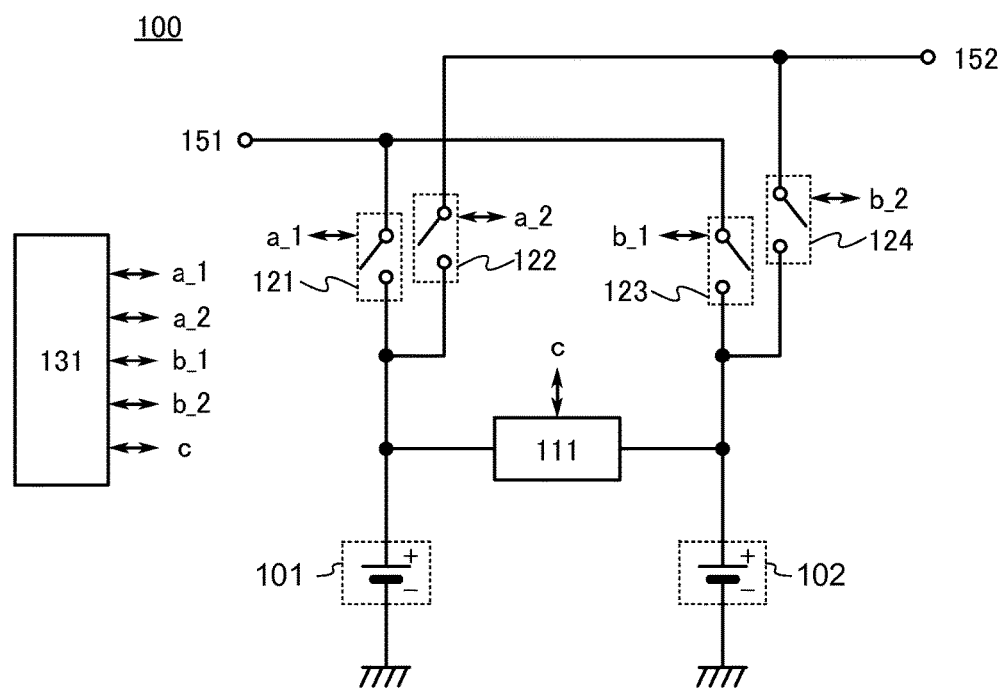

Four switches may be included as in FIG. 6B, for example.

In FIG. 6B, the one terminal of the switch 121 is electrically connected to the input terminal 151. The other terminal of the switch 121 is electrically connected to the one terminal of the DC/DC converter 111. One terminal of the switch 122 is electrically connected to the output terminal 152. The other terminal of the switch 122 is electrically connected to the other terminal of the DC/DC converter 111.

The one terminal of the switch 123 is electrically connected to an input terminal 151. The other terminal of the switch 123 is electrically connected to the other terminal of the DC/DC converter 111. One terminal of the switch 124 is electrically connected to the output terminal 152. The other terminal of the switch 124 is electrically connected to the other terminal of the DC/DC converter 111.

In Embodiment 1 and FIG. 1, FIGS. 2A1, 2A2, and 2B, FIGS. 3A and 3B, FIGS. 4A and 4B, and FIGS. 5A and 5B, the secondary battery 101 and the secondary battery 102 are each described as one secondary battery; however, one embodiment of the present invention is not limited thereto.

Figure 7:
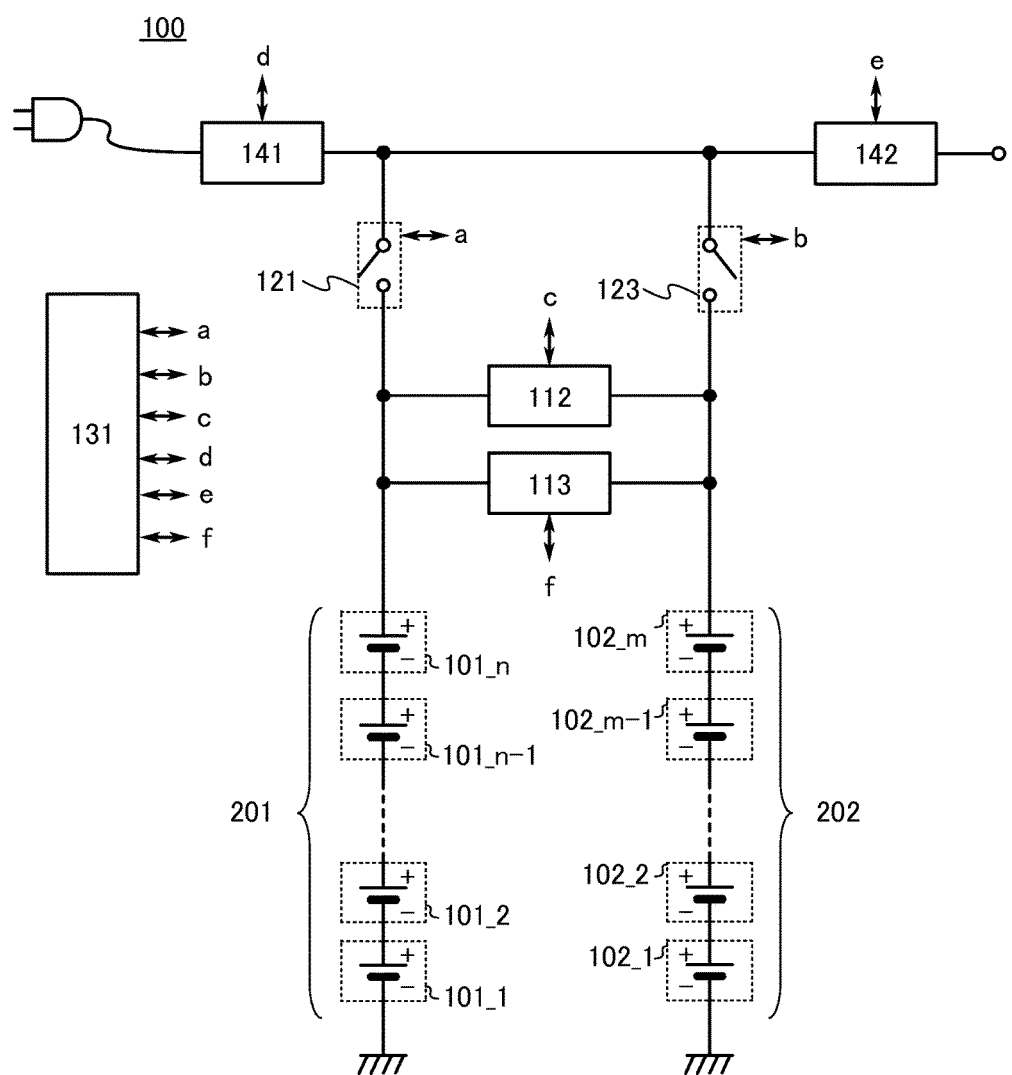
FIG. 7 illustrates a secondary battery module.

For example, instead of the secondary battery 101 and the secondary battery 102, a secondary battery group 201 and a secondary battery group 202 may be used. In each of the groups, a plurality of secondary batteries are electrically connected to each other in series. In FIG. 7, for example, the secondary battery group 201 includes n secondary batteries 101 (n is a natural number of 1 or more) which are electrically connected to each other in series and the secondary battery group 202 includes m secondary batteries 102 (m is a natural number of 1 or more) which are electrically connected to each other in series.

With such a plurality of secondary batteries which are electrically connected to each other in series, the output voltage of the secondary battery module 100 can be high. Note that the output voltage of one lithium-ion secondary battery is about 3.2 V. When each of the secondary battery group 201 and the secondary battery group 202 includes 100 lithium-ion secondary batteries which are electrically connected to each other in series, for example, the output voltage of the secondary battery module 100 can be increased to about 320 V.

Figure 8:
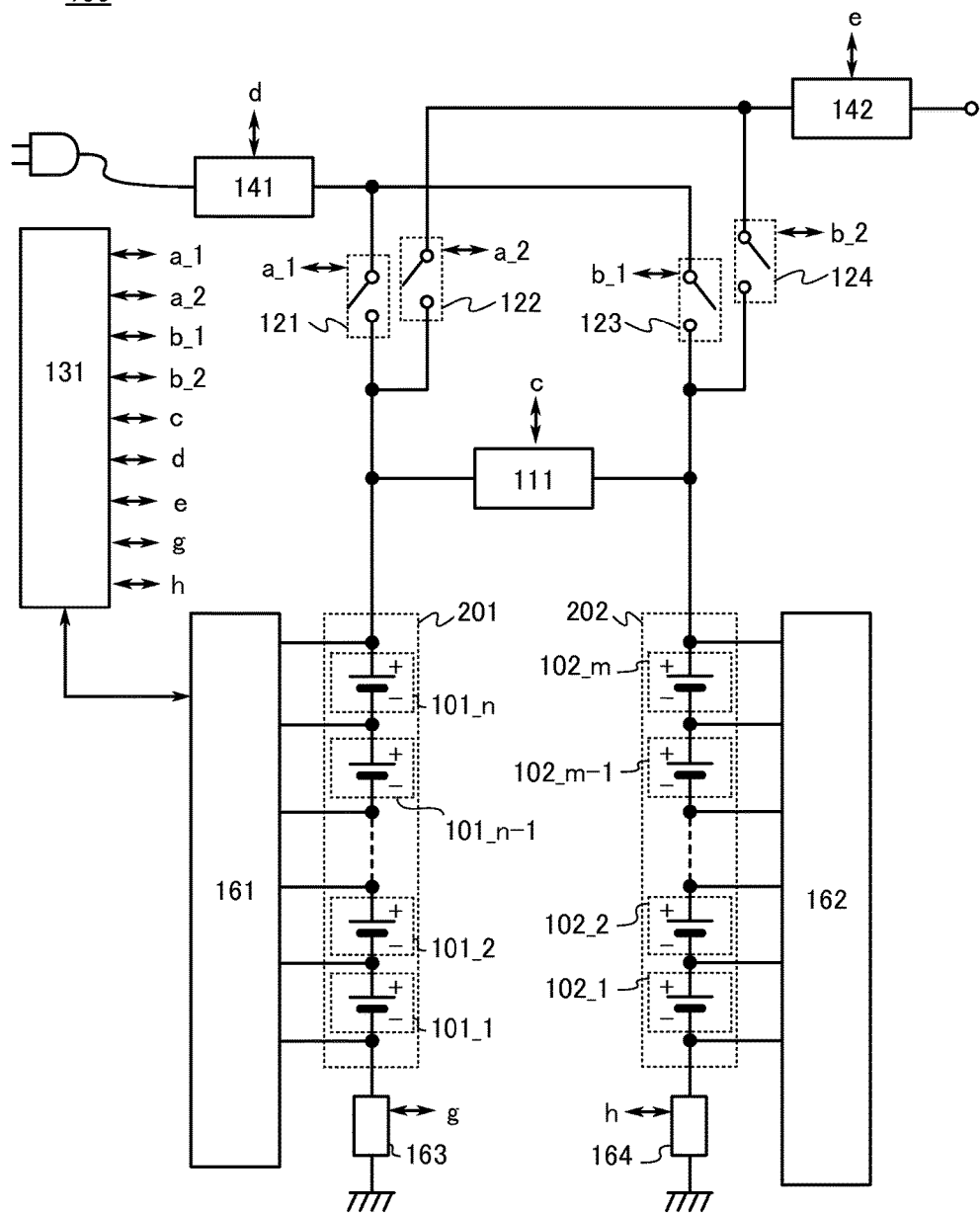
FIG. 8 illustrates a secondary battery module.

Further, a protection circuit which detects the states of all secondary batteries and controls them and a current detector may be provided as in FIG. 8. In FIG. 8, a protection circuit 161 is electrically connected to the secondary batteries 101_1 to 101_n, and a protection circuit 162 is electrically connected to the secondary batteries 102_1 to 102_m. A current detector 163 is electrically connected to the secondary battery group 201, and a current detector 164 is electrically connected to the secondary battery group 202.

The protection circuit 161, the protection circuit 162, the current detector 163, and the current detector 164 are electrically connected to the control circuit 131. The protection circuit 161, the protection circuit 162, the current detector 163, the current detector 164, and the control circuit 131 collectively have a function of protecting the secondary batteries from overcharge, overdischarge, and large current discharge due to an external short-circuit or the like in the following manners, for example: when the voltage of at least one secondary battery is increased to higher than or equal to a predetermined voltage (e.g., 4.35 V in the case of a lithium-ion secondary battery) during charging, the charging is stopped; when the voltage of at least one secondary battery is decreased to lower than or equal to a predetermined voltage (e.g., 2.3 V in the case of a lithium-ion secondary battery) during discharging, the discharging is stopped; and when the temperature of at least one secondary battery is outside a predetermined temperature range, charging/discharging is limited or stopped. With the protection circuits 161 and 162, the degradation of the secondary battery module 100 can be prevented and the safety of the secondary battery module 100 can be increased.

(Embodiment 3)

In this embodiment, examples of a DC/DC converter that can be used in one embodiment of the present invention will be described.

Figure 9A:
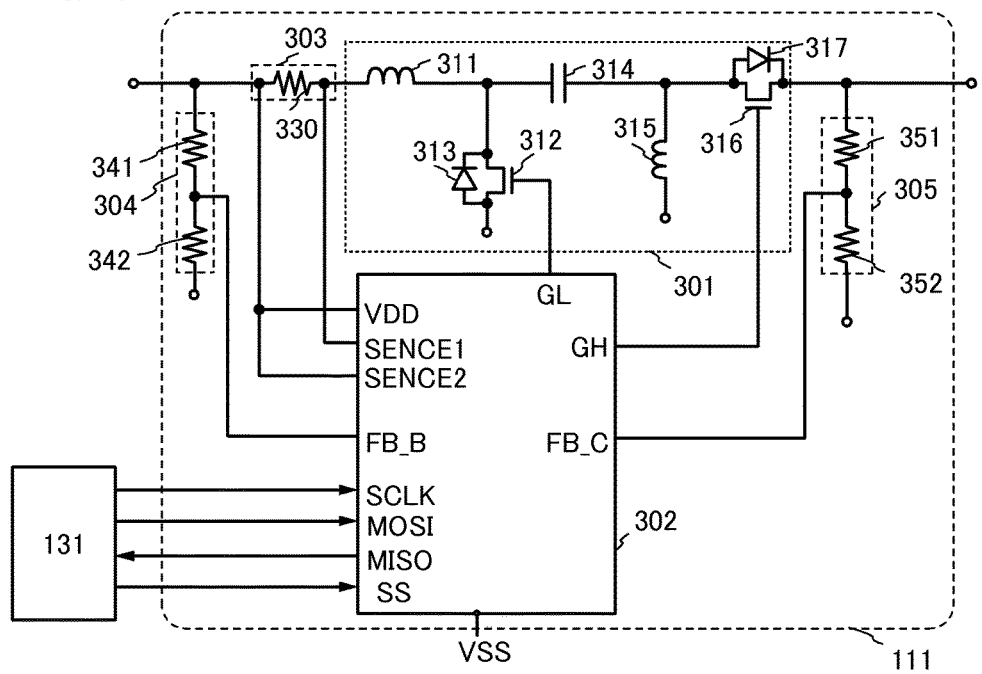
FIGS. 9A and 9B each illustrate a converter.

The DC/DC converter 111 described in Embodiment 1 and illustrated in FIG. 1, FIGS. 2A1, 2A2, and 2B, FIGS. 3A and 3B, FIGS. 4A and 4B, FIGS. 5A and 5B, FIG. 6B, and FIG. 8, has a configuration illustrated in FIG. 9A, for example.

The DC/DC converter 111 illustrated in FIG. 9A is an example of a single ended primary inductor converter (SEPIC) which is improved so that current flows in both directions. The DC/DC converter 111 includes a power stage 301, a control circuit 302, a current detector 303, a voltage detector 304, and a voltage detector 305.

The power stage 301 includes an inductor 311, a transistor 312, a diode 313, a capacitor 314, an inductor 315, a transistor 316, and a diode 317. The power stage 301 has a function of controlling the direction of current flowing through the DC/DC converter 111.

One terminal of the inductor 311 is connected to the current detector 303.

One of a source and a drain of the transistor 312 is connected to the other terminal of the inductor 311, and the other of the source and the drain of the transistor 312 is supplied with a low power supply potential VSS. A gate of the transistor 312 is connected to the control circuit 302. A control signal GL is input to the gate of the transistor 312.

An anode of the diode 313 is connected to the other of the source and the drain of the transistor 312, and a cathode of the diode 313 is connected to the one of the source and the drain of the transistor 312. The diode 313 may be a parasitic diode.

One of a pair of electrodes of the capacitor 314 is connected to the other terminal of the inductor 311.

One terminal of the inductor 315 is connected to the other of the pair of electrodes of the capacitor 314, and the other terminal of the inductor 315 is supplied with the low power supply potential VSS.

One of a source and a drain of the transistor 316 is connected to the other of the pair of electrodes of the capacitor 314, and the other of the source and the drain of the transistor 316 is connected to the voltage detector 305. A gate of the transistor 316 is connected to the control circuit 302. A control signal GH is input to the gate of the transistor 316.

As each of the transistor 312 and the transistor 316, a transistor including a silicon semiconductor, a transistor including a compound semiconductor, or a transistor including an oxide semiconductor can be used, for example.

An anode of the diode 317 is connected to the one of the source and the drain of the transistor 316, and a cathode is connected to the other of the source and the drain of the transistor 316. Note that the diode 317 may be a parasitic diode.

Accordingly, the power stage 301 has a configuration in which an input and an output are insulated from each other by the capacitor 314. With such a configuration, current can flow continuously; thus, the configuration is suitable for the charging method described in the above embodiment.

Figure 9B:
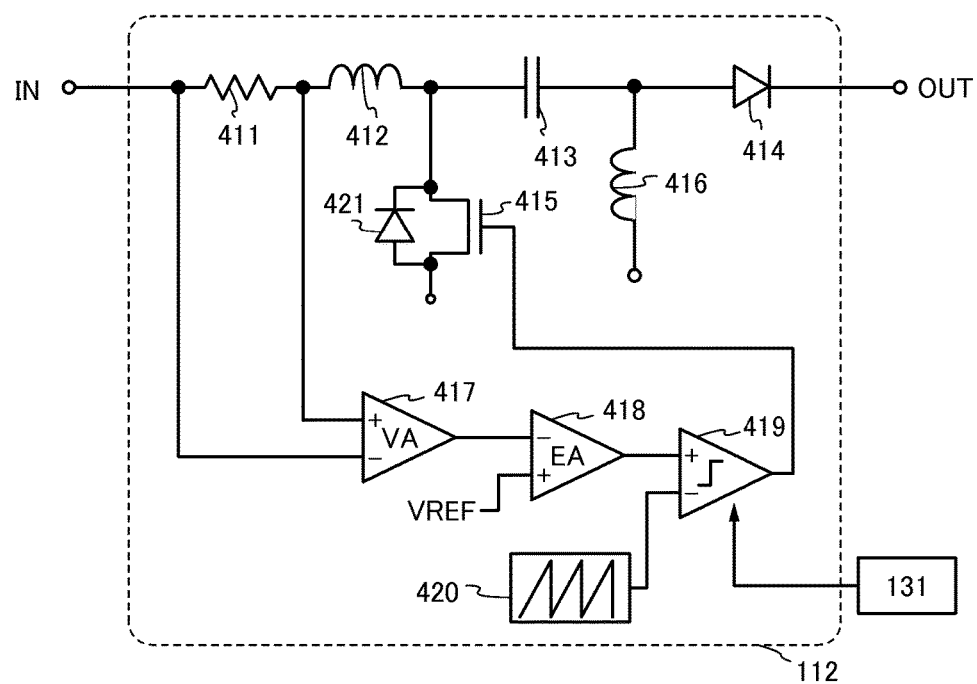

The DC/DC converter 112 and the DC/DC converter 113 described in Embodiment 1 and illustrated in FIG. 6A and FIG. 7 each have a configuration illustrated in FIG. 9B, for example.

The DC/DC converter 112 includes an inductor 412, an inductor 416, a transistor 415, a diode 421, a diode 414, a capacitor 413, a current detector 411, an instrumentation amplifier 417, an error amplifier 418, a comparator 419, and a triangular wave generating circuit 420.

One terminal of the inductor 412 is connected to one terminal of the current detector 411 and one input terminal of the instrumentation amplifier 417. The other terminal of the inductor 412 is connected to one electrode of the capacitor 413 and one of a source and a drain of the transistor 415.

One terminal of the inductor 416 is connected to the other electrode of the capacitor 413 and an anode of the diode 414. The other terminal of the inductor 416 is grounded.

The other of the source and the drain of the transistor 415 is grounded. A gate of the transistor 415 is connected to an output terminal of the comparator 419 through a buffer (not illustrated). As the transistor 415, a transistor including a silicon semiconductor, a transistor including a compound semiconductor, or a transistor including an oxide semiconductor can be used, for example.

An anode of the diode 421 is connected to one of the source and the drain of the transistor 415. A cathode of the diode 421 is connected to the other of the source and the drain of the transistor 415. Note that the diode 421 may be a parasitic diode.

A cathode of the diode 414 is connected to an output terminal.

The other terminal of the current detector 411 is connected to an input terminal and the other input terminal of the instrumentation amplifier 417.

An output terminal of the instrumentation amplifier 417 is connected to one input terminal of the error amplifier 418.

The other input terminal of the error amplifier 418 is applied with a reference potential. An output terminal of the error amplifier 418 is connected to one input terminal of the comparator 419.

The other input terminal of the comparator 419 is connected to the triangular wave generating circuit 420. The operation of the comparator 419 is controlled by the control circuit 131.

Accordingly, the DC/DC converter 112 has a configuration in which an input and an output are insulated from each other by the capacitor 413. With such a configuration, current can flow continuously; thus, the configuration is suitable for the charging method described in the above embodiment.

(Embodiment 4)

In this embodiment, an example of a switch that can be used in one embodiment of the present invention will be described.

Figure 10A:
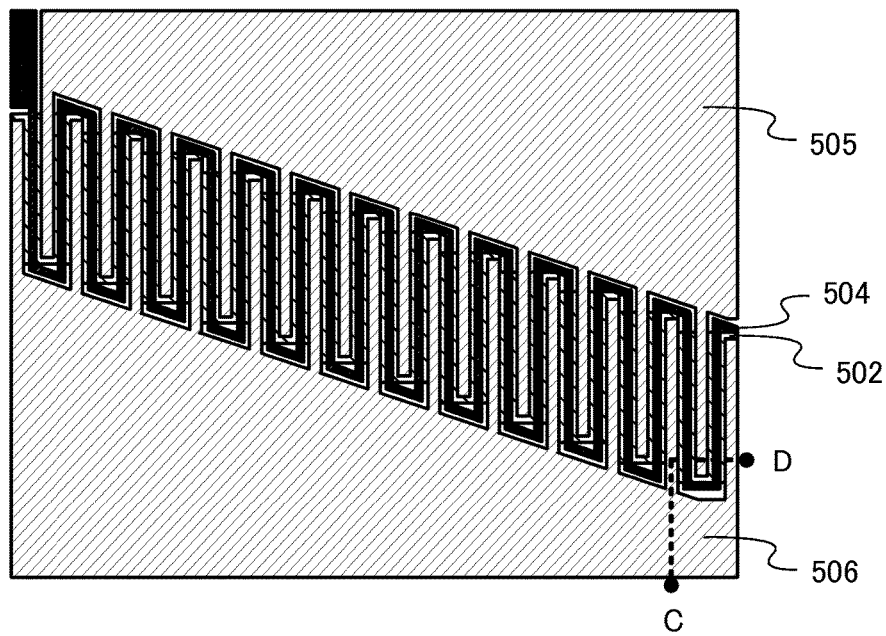
FIGS. 10A and 10B illustrate a structural example of a transistor.
Figure 10B:
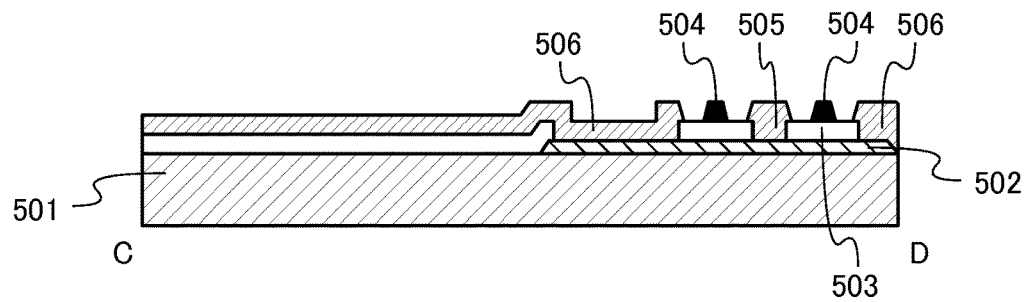

As each of the switches 121 to 124 described in Embodiment 1 and illustrated in FIG. 1, FIGS. 2A1, 2A2, and 2B, FIGS. 3A and 3B, FIGS. 4A and 4B, FIGS. 5A and 5B, FIGS. 6A and 6B, FIG. 7, and FIG. 8, a transistor 500 illustrated in FIGS. 10A and 10B can be used, for example.

FIG. 10A is a plan view of the transistor 500 and FIG. 10B is a cross-sectional view of the transistor 500 taken along dashed line C-D in FIG. 10A. In FIG. 10A, some components (e.g., a gate insulating film 503) are not illustrated for simplicity.

The transistor 500 includes, over a substrate 501, a semiconductor layer 502, the gate insulating film 503 over the semiconductor layer 502, a gate electrode 504 which is over the gate insulating film 503 and overlaps with the semiconductor layer 502, a source electrode 505 connected to the semiconductor layer 502, and a drain electrode 506 connected to the semiconductor layer 502.

Although an example of a top-gate transistor in which the gate electrode 504 is provided over the semiconductor layer 502 is illustrated in FIGS. 10A and 10B, one embodiment of the present invention is not limited thereto. A bottom-gate transistor in which the gate electrode 504 is provided below the semiconductor layer 502, or a double-gate transistor in which gate electrodes are provided over and below the semiconductor layer 502 may be used.

A transistor with a shape illustrated in FIGS. 10A and 10B has uniform current density and thus can be used as an efficient switch.

Although there is no particular limitation on a substrate used as the substrate 501, a substrate with a high heat dissipation property is preferably used. For example, a silicon substrate may be used, or the substrate 501 may be attached to a heat dissipating substrate.

For the semiconductor layer 502, an oxide semiconductor film can be used, for example. For the semiconductor layer 502, for example, a film of an In-based oxide semiconductor, a Zn-based oxide semiconductor, an In—Zn-based oxide semiconductor, an In—Ga—Zn-based oxide semiconductor, or the like can be used.

Alternatively, an oxide semiconductor including another metal element instead of part or all of Ga in the In—Ga—Zn-based oxide semiconductor may be used. As the aforementioned another metal element, a metal element that is capable of being bonded to oxygen atoms more than gallium is can be used, for example, and specifically one or more elements of titanium, zirconium, hafnium, germanium, and tin can be used, for instance. Alternatively, as the aforementioned another metal element, one or more elements of lanthanum, cerium, praseodymium, neodymium, samarium, europium, gadolinium, terbium, dysprosium, holmium, erbium, thulium, ytterbium, and lutetium may be used. These metal elements may have a function as a stabilizer and reduce generation of oxygen vacancies in the oxide film. Note that the amount of such a metal element added is determined so that the metal oxide can function as a semiconductor. When a metal element that is capable of being bonded to oxygen atoms more than gallium is used and oxygen is supplied to an oxide semiconductor, oxygen defects in the oxide semiconductor can be reduced.

When an oxide semiconductor film is used for the semiconductor layer 502, the transistor 500 can have extremely low off-state current. As a result, the secondary battery module 100 can be efficient.

(Embodiment 5)

In this embodiment, examples of shapes of a secondary battery and a secondary battery module which can be used in one embodiment of the present invention will be described.

<Secondary Battery>

<<Positive Electrode>>

First, a positive electrode of a secondary battery will be described.

The positive electrode includes a positive electrode current collector and a positive electrode active material layer formed over the positive electrode current collector by a coating method, a CVD method, a sputtering method, or the like, for example.

The positive electrode current collector can be formed using a material that has high conductivity and that is not alloyed with a carrier ion such as lithium ions, e.g., stainless steel, gold, platinum, zinc, iron, copper, aluminum, or titanium, or an alloy thereof. Alternatively, the positive electrode current collector can be formed using an aluminum alloy to which an element which improves heat resistance, such as silicon, titanium, neodymium, scandium, or molybdenum, is added. Further alternatively, the positive electrode current collector may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The positive electrode current collector can have a foil shape, a plate (sheet) shape, a net shape, a punching-metal shape, an expanded-metal shape, or the like as appropriate. The positive electrode current collector preferably has a thickness of greater than or equal to 10 μm and less than or equal to 30 μm.

The positive electrode active material layer at least includes the positive electrode active material, a conductive additive, and a binder.

Examples of the conductive additive are acetylene black (AB), ketjen black, graphite (black lead) particles, and carbon nanotubes in addition to graphene described later.

The positive electrode active material is in the form of particles made of secondary particles having average particle diameter and particle diameter distribution, which is obtained in such a way that material compounds are mixed at a predetermined ratio and baked and the resulting baked product is crushed, granulated, and classified by an appropriate means.

As the positive electrode active material, a material into/from which carrier ions such as lithium ions can be inserted and extracted is used.

For example, a lithium-containing material (General formula: LiMPO$_4$; M is one or more of Fe(II), Mn(II), Co(II), and Ni(II)) can be used. Typical examples of the general formula LiMPO$_4$ are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, a material such as Li$_{(2-j)}$MSiO$_4$ (general formula) (M is one or more of Fe(II), Mn(II), Co(II), and Ni(II); 0≤j≤2)) can be used. Typical examples of the general formula Li$_{(2-j)}$MSiO$_4$ are compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Further alternatively, any of the following lithium-containing materials with a layered rock-salt crystal structure can be used: lithium cobalt oxide (LiCoO$_2$); LiNiO$_2$; LiMnO$_2$; Li$_2$MnO$_3$; a NiCo-containing material (general formula: LiNi$_x$Co$_{1-x}$O$_2$ (0<x<1)) such as LiNi$_{0.8}$CO$_{0.2}$O$_2$; a NiMn-containing material (general formula: LiNi$_x$Mn$_{1-x}$O$_2$ (0<x<1)) such as LiNi$_{0.5}$Mn$_{0.5}$O$_2$; and a NiMnCo-containing material (also referred to as NMC) (general formula: LiNi$_x$Mn$_y$Co$_{1-x-y}$O$_2$ (x>0, y>0, and x+y<1)) such as LiNi$_{1/3}$Mn$_{1/3}$CO$_{1/3}$O$_2$.

Still further alternatively, for the positive electrode active material, any of other various compounds, such as an active material having a spinel crystal structure (e.g., LiMn$_2$O$_4$) and an active material having an inverse spinel crystal structure (e.g., LiMVO$_4$) can be used.

Yet still further alternatively, a solid solution containing any of the above materials as an end-member can be used.

In the case where carrier ions are alkali metal ions other than lithium ions or alkaline-earth metal ions, the following may be used as the positive electrode active material: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides.

A lithium-ion secondary battery whose carrier ions are lithium ions is preferable because there are advantages such as high energy density, a small memory effect, and favorable self-discharging characteristics.

Further, a lithium battery containing a lithium metal in a negative electrode is preferable because energy density can be further increased and a manufacturing process can be simplified. In a secondary battery containing a lithium metal in a negative electrode, a lithium dendrite tends to be deposited during charging. However, in the secondary battery module of one embodiment of the present invention, short discharging periods are inserted into the charging period of the secondary battery; thus, the growth of a lithium dendrite can be suppressed even in the case where the negative electrode contains a lithium metal.

Note that a carbon layer may be provided on a surface of the positive electrode active material. With a carbon layer, conductivity of an electrode can be increased. The positive electrode active material can be coated with the carbon layer by mixing a carbohydrate such as glucose at the time of baking the positive electrode active material.

In addition, the graphene which is added to the positive electrode active material layer as a conductive additive can be formed by performing reduction treatment on graphene oxide.

Here, graphene in this specification includes single-layer graphene or multilayer graphene including two to a hundred layers. The single-layer graphene refers to a sheet of one atomic layer of carbon molecules having $\pi$ bonds. Further, graphene oxide in this specification refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

In the case of multilayer graphene including graphene obtained by reducing graphene oxide, the interlayer distance of the graphene is greater than or equal to 0.34 nm and less than or equal to 0.5 nm, preferably greater than or equal to 0.38 nm and less than or equal to 0.42 nm, further preferably greater than or equal to 0.39 nm and less than or equal to 0.41 nm. In general graphite, the interlayer distance of single-layer graphene is 0.34 nm. Since the interlayer distance in the graphene used for the secondary battery of one embodiment of the present invention is longer than that in the general graphite, carrier ions can easily transfer between layers of the graphene in the multilayer graphene.

Graphene oxide can be formed by an oxidation method called a Hummers method, for example.

The graphene oxide includes an epoxy group, a carbonyl group, a carboxyl group, a hydroxyl group, or the like. Oxygen in a functional group of graphene oxide is negatively charged in a polar solvent typified by NMP (also referred to as N-methylpyrrolidone, 1-methyl-2-pyrrolidone, N-methyl-2-pyrrolidone, or the like); therefore, while interacting with NMP, the graphene oxide repels other graphene oxide and is hardly aggregated. For this reason, in a polar solvent, graphene oxide can be easily dispersed uniformly.

The length of one side (also referred to as a flake size) of the graphene oxide is greater than or equal to 50 nm and less than or equal to 100 µm, preferably greater than or equal to 800 nm and less than or equal to 20 µm.

Unlike a conductive additive in the form of particles such as acetylene black, which makes point contact with a positive electrode active material, the graphene is capable of surface contact with low contact resistance; accordingly, the electron conductivity between the particles of the positive electrode active material and the graphene can be improved without an increase in the amount of a conductive additive.

The solvent is removed by volatilization from a dispersion medium in which the graphene oxide is uniformly dispersed, and the graphene oxide is reduced to give graphene; hence, pieces of the graphene remaining in the positive electrode active material layer are partly overlapped with each other and dispersed such that surface contact is made, thereby a path for electron conduction can be formed.

Accordingly, when the graphene, whose raw material is the graphene oxide and which is formed by reduction performed after formation of a paste, is used as a conductive additive, the positive electrode active material layer can be formed to have high electron conductivity.

The ratio of the positive electrode active material in the positive electrode active material layer can be increased because it is not necessary to increase the added amount of the conductive additive in order to increase contact points between the positive electrode active material and the graphene. Accordingly, the discharge capacity of the secondary battery can be increased.

The average particle diameter of the primary particle of the positive electrode active material is less than or equal to 500 nm, preferably greater than or equal to 50 nm and less than or equal to 500 nm. To make surface contact with the plurality of particles of the positive electrode active material, the length of one side of the graphene is greater than or equal to 50 nm and less than or equal to 100 µm, preferably greater than or equal to 800 nm and less than or equal to 20 µm.

Examples of the binder included in the positive electrode active material layer are polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical example.

In the case where graphene is used as the conductive additive, it is preferable that the proportions of the positive electrode active material, the graphene as the conductive additive, and the binder with respect to the total weight of the positive electrode active material layer be greater than or equal to 90 wt % and less than or equal to 94 wt %, greater than or equal to 1 wt % and less than or equal to 5 wt %, and greater than or equal to 1 wt % and less than or equal to 5 wt %, respectively.

<<Negative Electrode>>

Next, a negative electrode of a secondary battery will be described.

The negative electrode includes a negative electrode current collector and a negative electrode active material layer formed over the negative electrode current collector by a coating method, a CVD method, a sputtering method, or the like, for example.

The negative electrode current collector can be formed using a material which has high conductivity and is not alloyed with carrier ions such as lithium ions, such as stainless steel, gold, platinum, zinc, iron, copper, or titanium, an alloy thereof, or the like. Alternatively, the negative electrode current collector may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The negative electrode current collector can have a foil shape, a plate (sheet) shape, a net shape, a punching-metal shape, an expanded-metal shape, or the like as appropriate. The negative electrode current collector preferably has a thickness of greater than or equal to 10 μm and less than or equal to 30 μm.

The negative electrode active material layer includes at least a negative electrode active material. Further, a conductive additive may be also included.

There is no particular limitation on the material of the negative electrode active material as long as it is a material with which a metal can be dissolved and deposited or a material into/from which metal ions can be inserted and extracted. Other than a lithium metal, graphite, which is a carbon material generally used in the field of power storage, can also be used as the negative electrode active material. Examples of graphite are low crystalline carbon such as soft carbon and hard carbon and high crystalline carbon such as natural graphite, kish graphite, pyrolytic carbon, mesophase pitch based carbon fiber, meso-carbon microbeads (MCMB), mesophase pitches, and petroleum-based or coal-based coke.

As the negative electrode active material, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such metals have higher capacity than graphite. In particular, silicon has a significantly high theoretical capacity of 4200 mAh/g. For this reason, silicon is preferably used as the negative electrode active material.

The negative electrode active material layer may be formed by a coating method in such a manner that a conductive additive and the binder are added to the negative electrode active material to form a paste and the negative electrode paste is applied onto the negative electrode current collector and dried.

Note that the negative electrode active material layer may be predoped with lithium. As a predoping method, a sputtering method may be used to form a lithium layer on a surface of the negative electrode active material layer. Alternatively, the negative electrode active material layer can be predoped with lithium by providing lithium foil on the surface thereof.

Further, graphene is preferably formed on a surface of the negative electrode active material. In the case of using silicon as the negative electrode active material, the volume of silicon is greatly changed due to occlusion and release of carrier ions in charge-discharge cycles. Therefore, adhesion between the negative electrode current collector and the negative electrode active material layer is decreased, resulting in degradation of battery characteristics caused by charging and discharging. In view of this, graphene is preferably formed on a surface of the negative electrode active material containing silicon because even when the volume of silicon is changed in charge-discharge cycles, decrease in adhesion between the negative electrode current collector and the negative electrode active material layer can be regulated, which makes it possible to reduce degradation of battery characteristics.

Graphene formed on the surface of the negative electrode active material can be formed by reducing graphene oxide in a manner similar to that of the method for forming the positive electrode. As the graphene oxide, the above-described graphene oxide can be used.

Further, a coating film of oxide or the like may be formed on the surface of the negative electrode active material. A coating film formed by decomposition of an electrolyte solution in charging cannot release electric charges used at the time of forming the coating film, and therefore forms irreversible capacity. In contrast, the coating film of oxide or the like provided on the surface of the negative electrode active material in advance can reduce or prevent generation of irreversible capacity.

As the coating film coating the negative electrode active material, an oxide film of any one of niobium, titanium, vanadium, tantalum, tungsten, zirconium, molybdenum, hafnium, chromium, aluminum, and silicon or an oxide film containing any one of these elements and lithium can be used. The coating film is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can be permeable to lithium ions.

A sol-gel method can be used to coat the negative electrode active material with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material.

The use of the coating film can prevent a decrease in the capacity of the secondary battery.

<<Electrolyte Solution>>

As a solvent for the electrolyte solution used in the secondary battery, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

By gelling with a high-molecular material as the solvent for the electrolyte solution, safety against liquid leakage and the like is improved. Further, the secondary battery can be thinner and more lightweight. Typical examples of gelled high-molecular materials are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the power storage device from exploding or catching fire even when the secondary battery internally shorts out or the internal temperature increases due to overcharging or the like.

In the case of using a lithium ion as a carrier ion, examples of an electrolyte dissolved in the above-described solvent are one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$, or two or more of these lithium salts in an appropriate combination in an appropriate ratio.

As an electrolyte of the electrolytic solution, a material which contains carrier ions is used. Typical examples of the electrolyte include lithium salts such as $LiClO_4$, $LiAsF_6$, $LiBF_4$, $LiPF_6$, and $Li(C_2F_5SO_2)_2N$.

In the case where carrier ions are alkali metal ions other than lithium ions or alkaline-earth metal ions, the following may be used as the electrolyte: a compound or oxide which is obtained by substituting an alkali metal (e.g., sodium or potassium) or an alkaline-earth metal (e.g., calcium, strontium, barium, beryllium, or magnesium) for lithium in any of the above-described lithium salts.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator is not necessary. Further, the battery can be entirely solidified; therefore, there is no possibility of liquid leakage and thus the safety of the battery is dramatically increased.

<<Separator>>

As the separator of the secondary battery, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

<Shape of Secondary Battery Module>

Next, examples of a shape of the secondary battery module of one embodiment of the present invention will be described.

A secondary battery module 8000 illustrated in FIG. 11A1 includes an input-output terminal 8003 on a surface of a housing. The input-output terminal 8003 includes a positive electrode terminal and a negative electrode terminal In addition, a temperature detection terminal may be included.

As illustrated in FIG. 11A2, the secondary battery module 8000 includes, in the housing, a secondary battery 8005, a secondary battery 8006, and a circuit board 8009. The circuit board 8009 is provided with the input-output terminal 8003, a control circuit, a switch 8031, and a DC/DC converter 8011. The positive electrode terminals and the negative electrode terminals of the secondary batteries 8005 and 8006 are electrically connected to the control circuit and the switch 8031 of the circuit board 8009.

Each of the secondary batteries 8005 and 8006 is a laminated secondary battery (thin secondary battery) in which a layered film is used as an exterior body. The exterior body contains an electrolyte solution and a positive electrode, a negative electrode, and a separator which are wound.

A power storage system 8100 illustrated in FIG. 11B is an example of a home-use power storage system in which the secondary battery module of one embodiment of the present invention is used. However, without limitation to this, the secondary battery module of one embodiment of the present invention can be used for business use or other uses.

The power storage system 8100 includes an input terminal 8101 (plug) for electrically connecting the power storage system 8100 to a system power source and a connection cable 8104 for electrically connecting the power storage system 8100 to a home distribution board.

The power storage system 8100 may further include a display panel 8102 or the like for displaying an operation state or the like. The display panel may have a touch screen. In addition, the power storage system 8100 may include a switch for turning on and off a main power supply, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

FIG. 11C is a schematic view illustrating the inside of the power storage system 8100. The power storage system 8100 includes a secondary battery 8105 and a secondary battery 8106. In each of the secondary batteries 8105 and 8106, a plurality of secondary batteries are electrically connected to each other in series.

Further, the power storage system 8100 includes a DC/DC converter, a control circuit, a plurality of switches, and a battery management unit (BMU) 8107 and a power conditioning system (PCS) 8108 for monitoring the states of the power storage system.

Power from the system power source can be stored in the secondary batteries 8105 and 8106. The secondary batteries 8105 and 8106 are each electrically connected to the BMU 8107.

The BMU 8107 collects data of cell voltages and cell temperatures of a plurality of secondary batteries 8105 and 8106 in the power storage system 8100 the power storage elements, monitors overcharge and overdischarge, monitors overcurrent, controls a cell balancer, manages the degradation condition of a battery, calculates the remaining battery level (the state of charge (SOC)), controls a cooling fan of a driving power storage device, or controls detection of failure, for example. Further, the BMU 8107 is electrically connected to the PCS 8108.

The PCS 8108 is electrically connected to the system power source which is an AC power source and performs DC-AC conversion. For example, the PCS 8108 includes an inverter, a system interconnection protective device that detects irregularity of the system power source and terminates its operation, and the like. In storing power in the power storage system 8100, for example, AC power from the system power source is converted into DC power and transmitted to the BMU 8107. In deriving power from the power storage system 8100, power stored in the secondary battery 8106 is converted into AC power and supplied to an indoor load, for example. Note that the power may be supplied from the power storage system 8100 to the load through the distribution board as illustrated in FIG. 11B or may be directly supplied from the power storage system 8100 through wired or wireless transmission.

Note that a power source for charging the power storage system 8100 is not limited to the system power source described above; for example, power may be supplied from a solar power generating system installed outside or a power storage system mounted on an electric vehicle.

EXPLANATION OF REFERENCE

21: negative electrode, 22*a*: deposit, 22*b*: deposit, 22: deposit, 100: secondary battery module, 101: secondary battery, 102: secondary battery, 111: DC/DC converter, 112: DC/DC converter, 113: DC/DC converter, 121: switch, 122: switch, 123: switch, 124: switch, 131: control circuit, 141: AC/DC converter, 142: DC/AC converter, 151: input terminal, 152: output terminal, 153: input-output terminal, 161: protection circuit, 162: protection circuit, 163: current detector, 164: current detector, 301: power stage, 302: control circuit, 303: current detector, 304: voltage detector, 305: voltage detector, 311: inductor, 312: transistor, 313: diode, 314: capacitor, 315: inductor, 316: transistor, 317: diode, 411: current detector, 412: inductor, 413: capacitor, 414: diode, 415: transistor, 416: inductor, 417: instrumentation amplifier, 418: error amplifier, 419: comparator, 420: triangular wave generating circuit, 421: diode, 500: transistor, 501: substrate, 502: semiconductor layer, 503: gate insulating film, 504: gate electrode, 505: source electrode, 506: drain electrode, 8000: secondary battery module, 8003: input-output terminal, 8005: secondary battery, 8006: secondary battery, 8009: circuit board, 8011: DC/DC converter, 8031: switch, 8100: power storage system, 8101: input terminal, 8102: display panel, 8104: connection cable, 8105: secondary battery, 8106: secondary battery, 8107: BMU, and 8108: PCS.

This application is based on Japanese Patent Application serial no. 2013-008060 filed with Japan Patent Office on Jan. 21, 2013, the entire contents of which are hereby incorporated by reference.

The invention claimed is:

1. A secondary battery module comprising:
    a first lithium-ion secondary battery and a second lithium-ion secondary battery electrically connected to each other, each of the first lithium-ion secondary battery and the lithium-ion second secondary battery having a positive electrode and a negative electrode;
    an input terminal configured to be electrically connected to a power source;
    an output terminal;
    a first DC/DC converter, wherein a first terminal of the first DC/DC converter is electrically connected to a first electrode of the first lithium-ion secondary battery, and a second terminal of the first DC/DC converter is electrically connected to a first electrode of the second lithium-ion secondary battery;
    an AC/DC converter, wherein a first terminal of the AC/DC converter is electrically connected to the input terminal of the secondary battery module;
    a DC/AC converter, wherein a first terminal of the DC/AC converter is electrically connected to the output terminal of the secondary battery module;
    a first switch, wherein a first terminal of the first switch is electrically connected to the first terminal of the first DC/DC converter, and a second terminal of the first switch is electrically connected to a second terminal of the AC/DC converter;
    a second switch, wherein a first terminal of the second switch is electrically connected to the second terminal of the first DC/DC converter, and a second terminal of the second switch is electrically connected to a second terminal of the DC/AC converter; and
    a control circuit functionally connected to the first DC/DC converter, the AC/DC converter, the DC/AC converter, the first switch, and the second switch,
    wherein the control circuit is configured to insert a discharging period of one of the first and second lithium-ion secondary batteries into a charging period of the secondary battery module, thereby dissolving deposits comprising lithium on the negative electrode of the one of the first and second lithium-ion secondary batteries by discharging with current density higher than that for charging, and
    wherein the deposits are dissolved while constant current is supplied from the power source to secondary battery module.

2. The secondary battery module according to claim 1,
    wherein each of the first lithium-ion secondary battery and the second lithium-ion secondary battery includes a plurality of secondary battery cells, and
    wherein the plurality of secondary battery cells are electrically connected to each other in series.

3. The secondary battery module according to claim 2, further comprising:
    a protection circuit and a current detector electrically connected to the plurality of secondary battery cells.

4. The secondary battery module according to claim 1, wherein the second terminal of the first switch is electrically connected to the second terminal of the second switch.

5. The secondary battery module according to claim 1, wherein in the discharging period of the one of the first and second lithium-ion secondary batteries, the other of the first and second lithium-ion secondary batteries is charged with discharging current from the one of the first and second lithium-ion secondary batteries.

6. The secondary battery module according to claim 1, wherein the second terminal of the AC/DC converter is directly connected to the second terminal of the DC/AC converter.

7. The secondary battery module according to claim 1, wherein a length of the discharging period of the one of the first and second lithium-ion secondary batteries is $\frac{1}{100}$ to $\frac{1}{3}$ of a length of the charging period of the secondary battery module.

8. A secondary battery module comprising:
    a first lithium-ion secondary battery and a second lithium-ion secondary battery electrically connected to each other, each of the first lithium-ion secondary battery and the lithium-ion second secondary battery having a positive electrode and a negative electrode;
    an input terminal configured to be electrically connected to a power source;
    an output terminal;
    a first DC/DC converter, wherein a first terminal of the first DC/DC converter is electrically connected to a first electrode of the first lithium-ion secondary battery, and a second terminal of the first DC/DC converter is electrically connected to a first electrode of the second lithium-ion secondary battery;
    a second DC/DC converter, wherein a first terminal of the second DC/DC converter is electrically connected to the first electrode of the first lithium-ion secondary battery, and a second terminal of the second DC/DC converter is electrically connected to the first electrode of the second lithium-ion secondary battery;
an AC/DC converter, wherein a first terminal of the AC/DC converter is electrically connected to the input terminal of the secondary battery module;
a DC/AC converter, wherein a first terminal of the DC/AC converter is electrically connected to the output terminal of the secondary battery module;
a first switch, wherein a first terminal of the first switch is electrically connected to the first terminal of the first DC/DC converter and the first terminal of the second DC/DC converter, and a second terminal of the first switch is electrically connected to a second terminal of the AC/DC converter;
a second switch, wherein a first terminal of the second switch is electrically connected to the second terminal of the first DC/DC converter and the second terminal of the second DC/DC converter, and a second terminal of the second switch is electrically connected to a second terminal of the DC/AC converter; and
a control circuit functionally connected to the first DC/DC converter, the second DC/DC converter, the AC/DC converter, the DC/AC converter, the first switch, and the second switch,
wherein the control circuit is configured to insert a discharging period of one of the first and second lithium-ion secondary batteries into a charging period of the secondary battery module, thereby dissolving deposits comprising lithium on the negative electrode of the one of the first and second lithium-ion secondary batteries by discharging with current density higher than that for charging, and
wherein the deposits are dissolved while constant current is supplied from the power source to secondary battery module.

9. The secondary battery module according to claim 8, wherein each of the first lithium-ion secondary battery and the second lithium-ion secondary battery includes a plurality of secondary battery cells, and
wherein the plurality of secondary battery cells are electrically connected to each other in series.

10. The secondary battery module according to claim 9, further comprising:
a protection circuit and a current detector electrically connected to the plurality of secondary battery cells.

11. The secondary battery module according to claim 8, wherein the second terminal of the first switch is electrically connected to the second terminal of the second switch.

12. The secondary battery module according to claim 8, wherein in the discharging period of the one of the first and second lithium-ion secondary batteries, the other of the first and second lithium-ion secondary batteries is charged with discharging current from the one of the first and second lithium-ion secondary batteries.

13. The secondary battery module according to claim 8, wherein the second terminal of the AC/DC converter is directly connected to the second terminal of the DC/AC converter.

14. The secondary battery module according to claim 8, wherein a length of the discharging period of the one of the first and second lithium-ion secondary batteries is 1/100 to 1/3 of a length of the charging period of the secondary battery module.

15. A secondary battery module comprising:
a first lithium-ion secondary battery and a second lithium-ion secondary battery electrically connected to each other, each of the first lithium-ion secondary battery and the lithium-ion second secondary battery having a positive electrode and a negative electrode;
a DC/DC converter, wherein a first terminal of the DC/DC converter is electrically connected to a first electrode of the first lithium-ion secondary battery, and a second terminal of the DC/DC converter is electrically connected to a first electrode of the second lithium-ion secondary battery;
an input terminal electrically connected to the first lithium-ion secondary battery, the second lithium-ion secondary battery, and the DC/DC converter, wherein the input terminal is configured to be electrically connected to a power source;
an output terminal electrically connected to the input terminal, the first lithium-ion secondary battery, the second lithium-ion secondary battery, and the DC/DC converter;
a first switch, wherein a first terminal of the first switch is electrically connected to the first terminal of the DC/DC converter, and a second terminal of the first switch is electrically connected to the input terminal and the output terminal;
a second switch, wherein a first terminal of the second switch is electrically connected to the second terminal of the DC/DC converter, and a second terminal of the second switch is electrically connected to the input terminal, the output terminal, and the second terminal of the first switch; and
a control circuit functionally connected to the DC/DC converter, the first switch, and the second switch,
wherein the control circuit is configured to alternately insert discharging periods of the first and second lithium-ion secondary batteries into a charging period of the secondary battery module, thereby dissolving deposits comprising lithium on the negative electrode of the one of the first and second lithium-ion secondary batteries by discharging with current density higher than that for charging, and
wherein the deposits are dissolved while constant current is supplied from the power source to secondary battery module.

16. The secondary battery module according to claim 15, wherein each of the first lithium-ion secondary battery and the second lithium-ion secondary battery includes a plurality of secondary battery cells, and
wherein the plurality of secondary battery cells are electrically connected to each other in series.

17. The secondary battery module according to claim 16, further comprising:
a protection circuit and a current detector electrically connected to the plurality of secondary battery cells.

18. The secondary battery module according to claim 15, further comprising:
an AC/DC converter electrically connected to the second terminal of the first switch and the input terminal; and
a DC/AC converter electrically connected to the second terminal of the second switch and the output terminal.

19. The secondary battery module according to claim 18, the AC/DC converter is directly connected to the DC/AC converter.

20. The secondary battery module according to claim 15, wherein in one discharging period of one of the first and second lithium-ion secondary batteries, the other of the first and second lithium-ion secondary batteries is charged with discharging current from the one of the first and second lithium-ion secondary batteries.

21. The secondary battery module according to claim 15, wherein a length of the discharging period of the one of the first and second lithium-ion secondary batteries is $1/100$ to $1/3$ of a length of the charging period of the secondary battery module.

* * * * *